US012592118B2

(12) United States Patent
Simons et al.

(10) Patent No.: US 12,592,118 B2
(45) Date of Patent: Mar. 31, 2026

(54) PLAY-TO-EARN ELECTRONIC GAMING SYSTEMS AND METHODS

(71) Applicant: AG 18, LLC, Denver, CO (US)

(72) Inventors: Jordan Simons, Denver, CO (US); Nicholas Koustas, Cherry Hills, CO (US); John Mix, Denver, CO (US); Alexander Oxman, Denver, CO (US)

(73) Assignee: AG 18, LLC, Denver, CO (US)

( * ) Notice: Subject to any disclaimer, the term of this patent is extended or adjusted under 35 U.S.C. 154(b) by 487 days.

(21) Appl. No.: 17/715,635

(22) Filed: Apr. 7, 2022

(65) Prior Publication Data

US 2022/0230506 A1 Jul. 21, 2022

Related U.S. Application Data

(63) Continuation of application No. 16/907,954, filed on Jun. 22, 2020, now Pat. No. 11,302,141, which is a (Continued)

(51) Int. Cl.
*G07F 17/32* (2006.01)

(52) U.S. Cl.
CPC .......... *G07F 17/3223* (2013.01); *G07F 17/32* (2013.01); *G07F 17/3262* (2013.01); (Continued)

(58) Field of Classification Search
CPC .. G07F 17/32; G07F 17/3223; G07F 17/3262; G07F 17/3272; G07F 17/3286; G07F 17/3295
See application file for complete search history.

(56) References Cited

U.S. PATENT DOCUMENTS 4,685,677 A 8/1987 Demar et al.
4,760,527 A 7/1988 Sidley
(Continued)

FOREIGN PATENT DOCUMENTS

CN 101044520 A 9/2007
JP 2004-65339 A 3/2004
(Continued)

OTHER PUBLICATIONS

BlockGeeks: What is Blockchain Technology: A Step-by-Step Guide for Beginners, pp. 1-18, https://web.archive.org/web/20170103030405/http://blockgeeks.com/guides/what-is-blockchain-technology/ (Year: 2017).*

(Continued)

*Primary Examiner* — David L Lewis
*Assistant Examiner* — Shauna-Kay Hall

(57) ABSTRACT

Systems and methods for hosting one or more electronic games are described. A method in a system for hosting one or more electronic games includes receiving a selection by a player of an electronic game. The method includes enabling the electronic game to be played using a computing device operable by the player. The method also includes determining a game result based on game play by the player in the selected electronic game. The method further includes causing value to be awarded to the player in accordance with the game result. Various useful and technically advantageous features enabling play-to-earn electronic gaming where valuable payouts may be made in various non-monetary means.

159 Claims, 14 Drawing Sheets

Related U.S. Application Data continuation of application No. 16/146,956, filed on Sep. 28, 2018, now Pat. No. 10,692,325, which is a continuation-in-part of application No. 15/600,584, filed on May 19, 2017, now Pat. No. 10,497,220, which is a continuation-in-part of application No. 15/444,409, filed on Feb. 28, 2017, now Pat. No. 9,978,205, which is a continuation of application No. 12/488,241, filed on Jun. 19, 2009, now Pat. No. 9,613,498.

(60) Provisional application No. 61/074,572, filed on Jun. 20, 2008.

(52) U.S. Cl.
CPC ...... *G07F 17/3272* (2013.01); *G07F 17/3286* (2013.01); *G07F 17/3295* (2013.01)

(56) References Cited

U.S. PATENT DOCUMENTS 4,926,327 A 5/1990 Sidley
5,257,179 A 10/1993 DeMar
5,472,194 A 12/1995 Breeding et al.
5,755,621 A 5/1998 Marks et al.
5,762,552 A 6/1998 Vuong et al.
5,800,268 A 9/1998 Molnick
5,816,915 A 10/1998 Kadlic
5,882,260 A 3/1999 Marks et al.
5,984,779 A 11/1999 Bridgeman et al.
6,007,426 A 12/1999 Kelly et al.
6,093,100 A 7/2000 Singer et al.
6,104,815 A 8/2000 Alcorn et al.
6,264,561 B1 7/2001 Saffari et al.
6,347,086 B1 2/2002 Strachan
6,508,709 B1 1/2003 Karmarkar
6,676,522 B2 1/2004 Rowe et al.
6,679,777 B2 1/2004 Pfeiffer et al.
6,764,397 B1 7/2004 Robb
6,767,284 B1 7/2004 Koza
6,931,131 B1 8/2005 Becker, Jr. et al.
6,964,608 B1 11/2005 Koza
D512,466 S 12/2005 White et al.
7,040,987 B2 5/2006 Walker et al.
7,100,916 B2 9/2006 Kelly et al.
7,306,516 B2 12/2007 Losilevsky
7,361,091 B2 4/2008 Letovsky
7,367,563 B2 5/2008 Yoseloff et al.
7,680,038 B1 3/2010 Gourlay
7,699,695 B2 4/2010 White et al.
7,699,702 B2 4/2010 Daniel
7,758,411 B2 7/2010 Crawford, III et al.
7,794,324 B2 9/2010 White et al.
7,867,091 B2 1/2011 Moshal
7,914,381 B2 3/2011 Blythe et al.
D646,336 S 10/2011 Kelly et al.
D646,337 S 10/2011 Kelly et al.
8,052,526 B2 11/2011 Abbott et al.
8,070,582 B2 12/2011 Lutnick et al.
8,235,791 B2 8/2012 Kelly
8,235,792 B2 8/2012 Kelly
8,241,106 B2 8/2012 Kelly
8,298,067 B2 10/2012 Kelly et al.
8,392,506 B2 3/2013 Rowe et al.
8,460,109 B2 6/2013 Bryson et al.
8,491,393 B2 7/2013 Yang
8,529,349 B2 9/2013 Kelly et al.
8,531,293 B2 9/2013 Putz
8,535,158 B2 9/2013 Kelly et al.
8,545,311 B2 10/2013 Shore et al.
8,613,656 B2 12/2013 Wudtke et al.
8,616,958 B2 12/2013 Hermansen et al.
8,632,392 B2 1/2014 Shore et al.
8,657,666 B2 2/2014 Wudtke et al.
8,657,676 B2 2/2014 Kelly et al.
8,678,914 B2 3/2014 Young
8,715,053 B2 5/2014 Kelly et al.
8,721,427 B2 5/2014 Kelly et al.
8,727,892 B1 5/2014 Chun
8,734,231 B2 5/2014 Shore et al.
8,734,238 B2 5/2014 Arnone et al.
8,764,566 B2 7/2014 Miltenberger et al.
8,777,720 B2 7/2014 Kelly et al.
8,777,735 B1 * 7/2014 Fine .................... G07F 17/3227 463/25
8,821,270 B2 9/2014 Arnone et al.
8,821,296 B1 9/2014 Smurfit et al.
8,827,803 B2 9/2014 Kelly
8,856,657 B2 10/2014 Arbogast et al.
8,888,578 B2 11/2014 Kelly et al.
8,926,422 B2 1/2015 Anderson et al.
8,944,916 B2 2/2015 Abouchar et al.
8,992,307 B2 3/2015 Young
8,992,323 B2 3/2015 Kelly et al.
9,092,944 B2 7/2015 Kisenwether et al.
9,159,195 B2 10/2015 Frenkel
9,269,221 B2 2/2016 Gobbi et al.
9,275,514 B2 3/2016 Kelly et al.
9,336,962 B2 5/2016 Wudtke et al.
9,396,611 B2 7/2016 Frenkel
9,430,909 B2 8/2016 Shore et al.
9,483,908 B2 11/2016 Shore et al.
9,530,282 B2 12/2016 Graboyes Goldman et al.
9,589,417 B2 3/2017 Frenkel et al.
9,613,498 B2 4/2017 Koustas et al.
9,697,682 B2 7/2017 Frenkel et al.
9,704,335 B2 7/2017 Frenkel et al.
9,786,121 B2 10/2017 Frenkel
9,811,976 B2 11/2017 Shore et al.
9,824,533 B2 11/2017 Frenkel
9,830,768 B2 11/2017 Frenkel et al.
9,875,610 B2 1/2018 Frenkel et al.
9,881,449 B1 1/2018 Frenkel
9,911,271 B2 3/2018 Frenkel et al.
9,940,780 B2 4/2018 Frenkel et al.
9,947,176 B2 4/2018 Frenkel et al.
9,978,205 B2 5/2018 Koustas et al.
10,078,939 B2 9/2018 Frenkel et al.
10,083,571 B2 9/2018 Frenkel
10,089,823 B2 10/2018 Frenkel et al.
10,140,808 B2 11/2018 Frenkel
10,140,809 B2 11/2018 Frenkel
10,210,705 B2 2/2019 Frenkel et al.
10,226,687 B2 3/2019 Grauzer et al.
10,275,981 B2 4/2019 Frenkel et al.
10,325,449 B2 6/2019 Frenkel et al.
10,339,760 B2 7/2019 Frenkel et al.
10,497,220 B2 12/2019 Simons et al.
10,614,657 B2 4/2020 Koustas et al.
10,685,532 B2 6/2020 Frenkel
10,692,325 B2 6/2020 Simons et al.
10,720,009 B2 7/2020 Simons et al.
10,810,837 B2 10/2020 Frenkel et al.
10,832,519 B2 11/2020 Frenkel et al.
10,839,644 B2 11/2020 Frenkel
10,846,983 B2 11/2020 Frenkel et al.
10,964,161 B2 3/2021 Frenkel et al.
11,024,131 B2 6/2021 Simons et al.
11,037,398 B2 6/2021 Frenkel
11,055,956 B2 7/2021 Frenkel et al.
11,055,957 B2 7/2021 Frenkel et al.
11,074,778 B2 7/2021 Koustas et al.
11,302,141 B2 4/2022 Simons et al.
11,315,385 B2 4/2022 Frenkel et al.
11,583,758 B2 2/2023 Lutnick et al.
2001/0000118 A1 4/2001 Sines et al.
2001/0004609 A1 6/2001 Walker et al.
2001/0019965 A1 9/2001 Ochi et al.
2001/0037211 A1 11/2001 McNutt et al.
2001/0044337 A1 11/2001 Rowe et al.
2002/0002075 A1 1/2002 Rowe
2002/0025851 A1 2/2002 Frankulin et al.
2002/0028707 A1 3/2002 Pascal et al.

(56) References Cited

U.S. PATENT DOCUMENTS

2002/0049975 A1 4/2002 Thomas et al.
2002/0066996 A1 6/2002 Nelson et al.
2002/0094869 A1 7/2002 Harkham
2002/0098884 A1 7/2002 Adams
2002/0103028 A1 8/2002 Carter et al.
2002/0103029 A1 8/2002 Finlayson et al.
2002/0123377 A1 9/2002 Shulman
2002/0169015 A1 11/2002 Moody
2003/0003997 A1 1/2003 Vuong et al.
2003/0032474 A1 2/2003 Kaminkow
2003/0064805 A1 4/2003 Wells
2003/0109306 A1 6/2003 Karmarkar
2003/0125973 A1 7/2003 Mathews et al.
2003/0130041 A1 7/2003 Pascal et al.
2003/0139190 A1 7/2003 Steelberg et al.
2003/0176218 A1 9/2003 LaMay et al.
2003/0224854 A1 12/2003 Joao
2003/0236120 A1 12/2003 Reece et al.
2004/0038721 A1 2/2004 Wells
2004/0162124 A1 8/2004 Barton
2004/0192431 A1 9/2004 Singer et al.
2004/0192442 A1 9/2004 Wells et al.
2004/0259626 A1 12/2004 Akram et al.
2005/0026696 A1 2/2005 Hashimoto et al.
2005/0037842 A1 2/2005 Kastner
2005/0043094 A1 2/2005 Nguyen et al.
2005/0059458 A1 3/2005 Griswold et al.
2005/0090304 A1 4/2005 Crawford, III et al.
2005/0116020 A1 6/2005 Smolucha et al.
2005/0130728 A1 6/2005 Nguyen et al.
2005/0143169 A1 6/2005 Nguyen et al.
2005/0181870 A1 8/2005 Nguyen et al.
2005/0187020 A1 8/2005 Amaitis et al.
2005/0193209 A1 9/2005 Saunders et al.
2005/0212214 A1 9/2005 Pfeiffer et al.
2005/0215326 A1 9/2005 Iosilevsky
2006/0019745 A1 1/2006 Benbrahim
2006/0025221 A1 2/2006 Jain et al.
2006/0052150 A1 3/2006 Hedrick et al.
2006/0052157 A1 3/2006 Walker et al.
2006/0058008 A1 3/2006 Choksi
2006/0058088 A1 3/2006 Crawford, III et al.
2006/0080175 A1 4/2006 Rowe et al.
2006/0095790 A1 5/2006 Nguyen et al.
2006/0121968 A1 6/2006 Daniel
2006/0148550 A1 7/2006 Nee et al.
2006/0148560 A1 7/2006 Arezina et al.
2006/0189381 A1 8/2006 Daniel et al.
2006/0205484 A1 9/2006 Nicastro
2006/0229122 A1 10/2006 Macke
2006/0258425 A1 11/2006 Edidin et al.
2006/0287103 A1 12/2006 Crawford, III et al.
2007/0015584 A1 1/2007 Frenkel
2007/0024002 A1 2/2007 McMain et al.
2007/0054739 A1 3/2007 Amaitis et al.
2007/0087834 A1 4/2007 Moser et al.
2007/0202941 A1 8/2007 Miltenberger et al.
2007/0207855 A1 9/2007 Moody et al.
2007/0213112 A1 9/2007 Humphrey et al.
2007/0259709 A1 11/2007 Kelly et al.
2007/0259716 A1 11/2007 Mattice et al.
2007/0265092 A1 11/2007 Betteridge
2007/0298857 A1 12/2007 Schlottmann et al.
2008/0004107 A1 1/2008 Nguyen et al.
2008/0020848 A1 1/2008 Muir et al.
2008/0045317 A1 2/2008 Seelig et al.
2008/0070658 A1 3/2008 Labgold et al.
2008/0096650 A1 4/2008 Baerlocher
2008/0102957 A1 5/2008 Burman et al.
2008/0113782 A2 5/2008 Moshal
2008/0113803 A1 5/2008 Alderucci
2008/0132214 A1 6/2008 Dupray et al.
2008/0188309 A1 8/2008 Moshal
2008/0214288 A1 9/2008 Toneguzzo
2008/0248845 A1 10/2008 Morgan et al.
2008/0248849 A1 10/2008 Lutnick et al.
2008/0274802 A1 11/2008 Joao
2009/0062008 A1 3/2009 Karmarkar
2009/0082082 A1 3/2009 Carr-Gregg et al.
2009/0088253 A1 4/2009 Oberberger et al.
2009/0093300 A1 4/2009 Lutnick et al.
2009/0118016 A1 5/2009 Ben-Artzi et al.
2009/0124376 A1 5/2009 Kelly et al.
2009/0149246 A1 6/2009 Opaluch
2009/0186701 A1 7/2009 Rowe et al.
2009/0203432 A1 8/2009 Carter, Sr.
2009/0227362 A1 9/2009 Kelly et al.
2009/0239667 A1 9/2009 Rowe et al.
2009/0264203 A1 10/2009 Warkentin
2009/0270175 A1 10/2009 Kelly et al.
2009/0276341 A1 11/2009 McMahan et al.
2009/0276715 A1 11/2009 Arbogast et al.
2009/0318219 A1 12/2009 Koustas et al.
2009/0325686 A1 12/2009 Davis et al.
2009/0325695 A1 12/2009 Wudtke et al.
2009/0325715 A1 12/2009 Kelly et al.
2010/0035694 A1 2/2010 Losica
2010/0041470 A1 2/2010 Preisach
2010/0056243 A1 3/2010 Czyzewski et al.
2010/0062840 A1 3/2010 Herrmann
2010/0113140 A1 5/2010 Kelly et al.
2010/0240431 A1 9/2010 Herrmann et al.
2010/0273546 A1 10/2010 Lior et al.
2010/0317442 A1 12/2010 Thomas et al.
2011/0034237 A1 2/2011 Schulhof et al.
2011/0269436 A1 11/2011 Porco
2012/0046110 A1 2/2012 Amaitis et al.
2012/0052939 A1 3/2012 Lutnick et al.
2012/0135801 A1 5/2012 Finnimore et al.
2012/0143906 A1 6/2012 Sibbold et al.
2012/0149457 A1 6/2012 Loose et al.
2012/0237908 A1 9/2012 Fitzgerald et al.
2012/0276983 A1 11/2012 Young
2012/0322544 A1 12/2012 Rowe et al.
2013/0005428 A1 1/2013 Kelly
2013/0035152 A1 2/2013 Kelly
2013/0053118 A1 2/2013 Schueller et al.
2013/0065669 A1* 3/2013 Michaelson ........ G07F 17/3244 463/25
2013/0065670 A1* 3/2013 Michaelson ....... G06Q 20/0655 463/25
2013/0080238 A1 3/2013 Kelly et al.
2013/0143640 A1 6/2013 Young
2013/0225268 A1 8/2013 Caputo et al.
2013/0225282 A1 8/2013 Williams et al.
2013/0231180 A1 9/2013 Kelly et al.
2013/0288785 A1 10/2013 Arnone et al.
2013/0296047 A1 11/2013 Borissov et al.
2013/0303274 A1 11/2013 Gadher et al.
2013/0331158 A1 12/2013 Kurtz et al.
2013/0331163 A1 12/2013 Kroeckel et al.
2013/0331184 A1 12/2013 Kelly et al.
2014/0051497 A1 2/2014 Lang et al.
2014/0094256 A1 4/2014 Hilbert et al.
2014/0094272 A1 4/2014 Kelly et al.
2014/0094279 A1 4/2014 Lockard et al.
2014/0194199 A1 7/2014 DiGiovanni
2014/0221071 A1 8/2014 Calio et al.
2014/0243076 A1 8/2014 Arnone et al.
2014/0274268 A1 9/2014 Marshall et al.
2014/0287826 A1 9/2014 Zhao et al.
2014/0370959 A1 12/2014 Yacenda
2014/0370983 A1 12/2014 Suzuki et al.
2014/0378219 A1 12/2014 Arnone et al.
2015/0081888 A1 3/2015 Pham
2015/0130134 A1 5/2015 Lucier
2015/0194012 A1 7/2015 Hendrickson et al.
2015/0287264 A1 10/2015 De Viveiros Ortiz
2015/0294535 A1 10/2015 Hightower et al.
2015/0310703 A1* 10/2015 Katz .................. G07F 17/3244 463/25
2016/0071369 A1 3/2016 Graves et al.
2016/0078709 A1 3/2016 Stanford et al.
2016/0092988 A1 3/2016 Letourneau

(56) References Cited

U.S. PATENT DOCUMENTS

| | | | | |
|---|---|---|---|---|
| 2016/0098888 | A1 | 4/2016 | Andres | |
| 2016/0133123 | A1 | 5/2016 | Giobbi et al. | |
| 2017/0287269 | A1 | 10/2017 | Arnone et al. | |
| 2018/0114403 | A1 | 4/2018 | Jayachandran | |
| 2018/0268644 | A1* | 9/2018 | Cong | G07F 17/3213 |
| 2019/0333030 | A1* | 10/2019 | Ramasamy | G06Q 20/3674 |
| 2020/0038761 | A1* | 2/2020 | Packin | A63F 13/828 |
| 2022/0157131 | A1 | 5/2022 | Lutnick et al. | |

FOREIGN PATENT DOCUMENTS

| | | | |
|---|---|---|---|
| JP | 2008-513110 | A | 5/2008 |
| JP | 2008-178478 | A | 8/2008 |
| JP | 2008-220431 | A | 9/2008 |
| JP | 2008-546443 | A | 12/2008 |
| JP | 2010-128915 | A | 6/2010 |
| JP | 2013-162889 | A | 8/2013 |
| JP | 5414273 | B2 | 11/2013 |
| JP | 2014-524064 | A | 9/2014 |
| JP | 2015-502207 | A | 1/2015 |
| JP | 2016-76230 | A | 5/2016 |
| KR | 2001-0050000 | A | 6/2001 |
| KR | 2006-0049774 | A | 5/2006 |
| KR | 2013-0122904 | A | 11/2013 |
| WO | WO 2003/093921 | A2 | 11/2003 |
| WO | WO 2004/071601 | A2 | 8/2004 |
| WO | 2007011715 | A2 | 1/2007 |
| WO | WO 2012/167146 | A1 | 12/2012 |

OTHER PUBLICATIONS

Allway, Ryan, "Jackpot Acquires PokerTek Assets From Multimedia Games," TDM Financial, 2 pages, Jul. 2, 2015.
Amatic Industries GmbH, "Solitaire & Satellite," http://www.amatic.com/products/roulette/solitaire-satellite/, 5 pages, 2016, published prior to Jun. 24, 2016.
American Casino Guide, YouTube Video for "A Look at New Skill-Based Slots and Other Skill-Based Gaming Machines With Marcus Prater From AGEM," https://www.youtube.com/watch?v=wNjrG1mgabw&feature=youtu.be, 4 pages, Feb. 15, 2016.
American Casino Guide, YouTube Video for "A Look at Two New Skill-Based Video Games Coming to Casinos—Pinball and a Pac-Man Clone," https://www.youtube.com/watch?v=DsEveU9Q-is&feature=youtu.be, 2 pages, Apr. 8, 2016.
American Casino Guide, YouTube Video for "Skill-Based Slot Machines From Gamblit Gaming," https://www.youtube.com/watch?v=11WJgLm0zLk&feature=youtu.be, 2 pages, Dec. 11, 2015.
American Casino Guide, YouTube Video for "Take 'n Play Gaming System From Bally Technologies," https://youtu.be/08k170fUq0o, 3 pages, Jan. 15, 2015.
Aristocrat Technologies Australia Pty Ltd, "Poker Machines," 5 pages, 2016, published prior to Jun. 24, 2016.
Bally Technologies, Inc., "Alpha Pro iDeck," 1 page, 2016, published prior to Jun. 24, 2016.
Bally Technologies, Inc., "Bally Live Floor View," https://www.ballytech.com/Systems/Analytics/Bally-Live-Floor-View, 1 page, 2016, published prior to Jun. 24, 2016.
Bally Technologies, Inc., "Frequently Asked Questions About iView Display Manager," 2 pages, 2014.
Bally Technologies, Inc., "Home," http://www.ballytech.com/, 1 page, 2016, published prior to Jun. 24, 2016.
Bally Technologies, Inc., "Server-Based Solutions," 1 page, 2016, published prior to Jun. 24, 2016.
Bally Technologies, Inc., "Take 'n Play," https://www.ballytech.com/games/Take-'n-Play, 1 page, 2016, published prior to Jun. 24, 2016.
Bally Technologies, Inc., "Wayfinder," https://www.ballytech.com/Systems/Media-Management/CoolSign/Wayfinder, 1 page, 2016, published prior to Jun. 24, 2016.
Berzon, Alexandra, "Are Slot Machines About to Get Smart?," The Wall Street Journal, 4 pages, Jun. 15, 2016.
Bruzda, Natalie, "Esports Amenities Attract Customers to the Downtown Grand," Las Vegas Review—Journal, Inc., 4 pages, Jun. 14, 2016.
Buckeye Charity Poker, YouTube Video for "PokerTek Tables," https://www.youtube.com/watch?v=LhDe3dfSucU&feature=youtu.be, 2 pages, Oct. 15, 2012.
CAMS, LLC, "What We Do," 4 pages, 2015.
Carnival Corporation & plc, Press Release for "Carnival Corporation Debuts PlayOcean Mobile and Interactive Games," PRNewswire, 10 pages, Sep. 25, 2017.
CBS This Morning, YouTube Video for "Video Games That Pay Out in Vegas," https://www.youtube.com/watch?v=i10RU23Uvng&feature=youtu.be, 2 pages, Oct. 7, 2015.
Ceasars Interactive Entertainment, Inc., "WSOP Tournaments Same IP Address Issue," http://forum.wsop.com/chat/wsop-tournaments-same-ip-address-issue, 6 pages, 2015.
Dianaevoni, YouTube Video for "Frogger Slot Machine-Preview-G2e-Konami Gaming," https://www.youtube.com/watch?v=S_DIkonEMWU&feature=youtu.be, 3 pages, Oct. 11, 2015.
Dye, Dave, "Graboyes Betting on Video Game Slot Machines," Gaming Today.com, 4 pages, Apr. 26, 2016.
Dynamic Gaming Systems, "The New Era in Gaming," https://web.archive.org/web/20161026175350/http://www.dynamicgamingsystems.com/, 2 pages, Oct. 26, 2016.
Dynamic Gaming Systems, YouTube Video for "Shaq Jack," https://youtu.be/gPYeNXrEIDQ, 2 pages, May 30, 2014.
European Patent Application No. 17159425.2, Extended European Search Report, 9 pages, Apr. 10, 2017.
Fantini Research, YouTube Video for "Scientific Games," https://www.youtube.com/watch?v=6wEqlsGp6uM, 2 pages, Sep. 30, 2015.
Feldberg, Sarah, "In Pursuit of a Winning Strategy: Getting Millennials to Gamble," Travel Weekly, 7 pages, May 4, 2016.
Fitzgerald, Clare, "Nevada Gaming Policy Committee Gets a Lesson in eSports," Casino City, 2 pages, May 16, 2016.
Fogel, Stefanie, "Bringing eSports to a Las Vegas Casino," Polygon, 4 pages, Apr. 28, 2016.
Gamblit Gaming, LLC, "Gaming Meets Gambling," 4 pages, 2016.
Gamblit Gaming, LLC, "NGCB SB9 Regulations Public Input," 15 pages, 2015.
GameAccount Network Plc, "Delivering Your Business Online," http://www.gan.com, 4 pages, Apr. 16, 2016.
GameCo Inc., "The Video Game Casino," http://gco.gg/, 9 pages, 2015.
Gameco, Inc., Press Release for "GameCo Announces Partnership With Suzo-Happ to Develop Controller for Its Video Game Gambling Machine," PR Newswire Association LLC, 3 pages, Dec. 15, 2015.
GameCo, Inc., Press Release for "GameCo Furthers Nationwide Rollout of Video Game Gambling Machines (VGM™) With Deployment at Choctaw Casino & Resort in Durant, Oklahoma," PR Newswire, 3 pages, Sep. 25, 2017.
GameCo, Inc., Press Release for "GameCo Makes Patented Video Game Gambling Machine Platform Available for Product Development to Select Game Developers," PR Newswire, 5 pages, Jul. 27, 2017.
GameCo, Inc., Press Release for "Skill-Based Video Game Gambling Company GameCo, Inc., Announces Gaming License in Progress With Division of Gaming Enforcement in New Jersey," PR Newswire Association LLC, 2 pages, Mar. 16, 2016.
Gaming Intelligence Services Ltd., "Jackpot Digital to Acquire PokerTek From Multimedia Games," 6 pages, Jul. 3, 2015.
Gaming Intelligence Services Ltd., "New Jersey Regulator Fines GAN Over Geolocation Failures," http://www.gamingintelligence.com/legal/38444-new-jersey-regulator-fines-gan-over-geolocation-failures, 3 pages, 2015.
Gaming Laboratories International LLC, "GLI Standards," 5 pages, 2016, published prior to Jun. 24, 2016.
Gaming Laboratories International, LLC, "GLI-21: Client Server Systems," Version 2.2, 26 pages, Sep. 6, 2011.
Gaming Standards Association, Brochure for "End of Life Strategy, SAS," 2 pages, undated, published prior to Jun. 24, 2016.

(56) References Cited

OTHER PUBLICATIONS

Graft, Kris, "The Man Behind XBLA Places Bet on Skill-Based, Real-Money Gaming on Mobile," Gamasutra, 3 pages, Jun. 8, 2016.
Henderson, Hartley, "eSports and Skill Based Video Games Could Be the Future of Gambling," OSGA, LLC, 3 pages, Mar. 16, 2016.
Heuer, Mike, "eSports Goes Big in Las Vegas," CDC Gaming Reports, 2 pages, Apr. 19, 2016.
Hwang, Jeff, "G2E 2015: Evaluating the Skill-Based Games," The Motley Fool, 12 pages, Oct. 11, 2015.
IGamingBusiness, "GameAccount Granted US Patent For iBridge Framework," http://www.igamingbusiness.com/news/gameaccount-granted-us-patent-ibridge-framework, 3 pages, Sep. 18, 2014.
IGT, Product Brochure for "IGT Floor Manager," 1 page, 2015.
IGT Global Solutions Corporation, "Centipede—Reel Edge—Video Slot," http://www.igt.com/games/centipede-reel-edge-20r4011024w200c-ascent-mld-video-reel-sc3 , 3 pages, 2016, published prior to Jun. 24, 2016.
IGT Global Solutions Corporation, "Home," http://www.igt.com, 4 pages, 2016, published prior to Jun. 24, 2016.
IGT Global Solutions Corporation, "Reel Edge Blood Life—Slot," http://www.igt.com/games/reel-edge-blood-life-3r5lcmb-s-avp-spinning-reel-gw9, 3 pages, 2016, published prior to Jun. 24, 2016.
IGT Global Solutions Corporation, Product Brochure for "IGT Tournament Manager," 5 pages, 2016, published prior to Jun. 24, 2016.
IGT, "Slot Accounting System Protocol," 5 pages, undated, published prior to Jun. 24, 2016.
IGT, Product Brochure for "IGT Casinolink Slot Management," 1 page, 2015.
IGT, Product Brochure for "IGT Machine Accounting," 1 page, 2016, published prior to Jun. 24, 2016.
IGT, Product Brochure for "IGT Media Manager," 1 page, 2016, published prior to Jun. 24, 2016.
IGT, Product Brochure for "IGT Multi-Denomination Multi-Game," 1 page, 2016, published prior to Jun. 24, 2016.
IGT, Product Brochure for "Mobile Host 2.0," 1 page, 2016, published prior to Jun. 24, 2016.
IGT, Product Brochure for "Property Info," 1 page, 2016, published prior to Jun. 24, 2016.
IGT, Product Brochure for "sbX Analytics," 1 page, 2015.
IGT, Product Brochure for "Table Manager," 1 page, 2016, published prior to Jun. 24, 2016.
IGT, Product Brochure for "Tournament Manager 5.0," 2 pages, 2016, published prior to Jun. 24, 2016.
IGT, Product Brochure for "Visual Slot Performance Tool," 1 page, 2016, published prior to Jun. 24, 2016.
IGT, YouTube Video for "Reel Edge Slots Series—Live From G2E 2010 IGT Presents Reel Edge Skill-Based Slot Machines," http://youtu.be/WTW846HFC1U, 2 pages, Nov. 12, 2010.
International Application No. PCT/US2006/027339, International Search Report & Written Opinion, 6 pages, Jan. 16, 2007.
International Application No. PCT/US2017/020950, International Search Report & Written Opinion, 12 pages, Jul. 3, 2017.
ISDgames, "About ISDgames," http://www.isdgames.com/about-isdgames, 1 page, 2015.
ISDgames, "NetPoker," http://www.playnetpoker.net/, 1 page, 2012.
Japanese Patent Application No. 2017-161782, Office Action, 5 pages, Dec. 18, 2017.
Japanese Patent Application No. 2018-023692, Office Action, 7 pages, May 29, 2018.
Japanese Patent Application No. 2018-023693, Office Action, 6 pages, May 29, 2018.
Japanese Patent Application No. 2018-198082, Office Action, 11 pages, Jan. 7, 2020.
Japanese Patent Application No. 2019-232490, Office Action, 6 pages, Sep. 1, 2020.
Japanese Patent Application No. 2019-232493, Office Action, 11 pages, Mar. 16, 2021.
Japanese Patent Application No. 2020-013213, Office Action, 8 pages, Feb. 2, 2021.
Japanese Patent Application No. 2020-013214, Office Action, 9 pages, Feb. 2, 2021.
Japanese Patent Application No. 2020-013215, Office Action, 6 pages, Jun. 24, 2020.
Japanese Patent Application No. 2020-013216, Office Action, 6 pages, Jun. 24, 2020.
Japanese Patent Application No. 2020-013216, Office Action, 6 pages, Oct. 20, 2020.
Johnson, Robert, "Hard Rock to Add Skill-Based Gambling to Atlantic City Casino," 3 pages, Jun. 10, 2017.
Kent, Steve, "Darion Lowenstein: Mixing It Up in Real-Money Gaming|Casual Connect Video," GameSauce, 12 pages, Mar. 21, 2016.
Kim, Sangmin et al., "Design and Implementation of Casino Slot Machine Accounting Protocol Engine," Advanced Science and Technology Letters, vol. 54, pp. 65-68, 2014.
Komenda, Ed, "How Online Poker Companies Track Players and Verify Their Location," Vegas Inc., 4 pages, Sep. 24, 2013.
Konami Gaming, Inc., "Home," http://www.gaming.konami.com/, 1 page, 2016, published prior to Jun. 24, 2016.
Konami Gaming, Inc., "Industry Recognizes Konami Gaming, Inc.'s True-Time Tournament With Innovative Gaming Technology Award," 2 pages, Apr. 23, 2013.
Konami Gaming, Inc., "Konami Partners With Spin Games to Deliver Online Slot Game Content via Remote Gaming Server," 3 pages, Sep. 22, 2015.
Konami Gaming, Inc., YouTube Video for "Introducing the First Frogger Slot Machine," https:/www.youtube.com/watch?v=JSXC1zKCGzE&Feature=youtu.be, 2 pages, Apr. 27, 2016.
Korean Patent Application No. 2020-7001427, Notice of Allowance, 3 pages, Jan. 29, 2020.
Korean Patent Application No. 2020-7012392, Office Action, 6 pages, Aug. 26, 2020.
Korean Patent Application No. 2020-7016736, Office Action, 4 pages, Sep. 11, 2020.
Leap Forward Gaming, "SaffariNet Features & Benefits," 2 pages, Aug. 31, 2015.
Leap Forward Gaming, "SaffariNet," 3 pages, 2016, published prior to Jun. 24, 2016.
Leap Forward Gaming, Inc., Product Brochure for "SaffariNet," 2 pages, undated, published prior to Jun. 24, 2016.
Locationsmart, "Home," https://www.locationsmart.com, 4 pages, Jun. 23, 2016.
Macau Patent Application No. I/1494, Office Action, 9 pages, Nov. 22, 2018.
Meltzer, Marc, "Will Skill-Based Slots Reach Younger Casino Patrons, Scare Away Bluehairs?," Covers Media Group Ltd., 3 pages, Sep. 23, 2015.
MicroFirst Gaming Inc., "Home," http://www.microfirst.com/, 3 pages, 2016, published prior to Jun. 24, 2016.
Morgan, Adam, "Space Invaders Slot With Skill-Based Bonus Coming to Atlantic City Casinos," World Casino News, 2 pages, Jun. 9, 2017.
Morris, J. D., "Coming Soon to Casinos: Betting on Yourself," Vegas Inc., 4 pages, Sep. 28, 2015.
Morris, J. D., "Look to the Future: Games on Display at G2E Show Transition to Skill-Based Products," Vegas Inc., 4 pages, Oct. 2, 2015.
NanoTech Gaming, Inc., "News," http://www.nanotechgaming.com/news.php, 1 page, 2015.
Nevada Gaming Control Board, "History of Adopted Regulations, Technical Standards, & Technical Policies," 10 pages, 2016, published prior to Jun. 24, 2016.
Nevada Gaming Control Board, "Regulation 5, Operation of Gaming Establishments, Adoption of New Regulation 5.220: Operation of a Mobile Gaming System," 3 pages, Mar. 23, 2006.
Nevada Gaming Control Board, "Regulation 5, Operation of Gaming Establishments, Proposed Amendments," 14 pages, May 8, 2017.
Nevada Gaming Control Board, "Regulation 14, Manufacturers, Distributors, Operators of Inter-CasinoLinked Systems, Gaming Devices, New Games, Inter-Casino Linked Systems, On-Line Slot Metering Systems, . . . ," 33 pages, Nov. 2015.

(56) References Cited

OTHER PUBLICATIONS

Nevada Gaming Control Board, "Regulations," 402 pages, Feb. 2015.
Nevada Gaming Control Board, "Technical Standards for Gaming Devices and Associated Equipment, Definitions," 3 pages, Feb. 15, 2016.
Nevada Gaming Control Board, "Technical Standards for Gaming Devices and Associated Equipment, Standard 1, Integrity of Gaming Devices," 15 pages, Feb. 15, 2016.
Nevada Gaming Control Board, "Technical Standards for Gaming Devices and Associated Equipment, Standard 2, Proper Accounting for Gaming Devices," 5 pages, Feb. 15, 2016.
Nevada Gaming Control Board, "Technical Standards for Gaming Devices and Associated Equipment, Standard 3, Integrity of and Proper Accounting for On-Line Slot Systems and Cashless Wagering Systems," 7 pages, Aug. 2011.
Nevada Gaming Control Board, "Technical Standards for Gaming Devices and Associated Equipment, Standard 4, Mobile Gaming Systems," 1 page, Aug. 2011.
Nevada Gaming Control Board, "Technical Standards for Gaming Devices and Associated Equipment, Standard 5, Cashless Wagering Kiosk," 2 pages, Aug. 2011.
Nevada Gaming Control Board, "Technical Standards For Gaming Devices and Associated Equipment, Standard 6, Interactive Gaming Systems and Associated Equipment," 13 pages, Jan. 27, 2012.
Nevada, Senate Bill No. 9—Committee on Judiciary—Impact of Technology on Gaming, 3 pages, Dec. 19, 2014.
New Jersey, Temporary Regulation 13:69E-1.28Y, "Skill Based Gaming," 2 pages, Feb. 2016.
Newswire, "E-Gaming Spotlights Its Latest Game Mixes for E-Neon Cabinets," 1 page, 2016, published prior to Jun. 24, 2016.
OnlineCasino.org, "GameCo Wants to Bring Skill-Based Games to a Struggling Atlantic City,"http://www.onlinecasino.org/news/gamecowantstobringskill-basedgamestoastrugglingatlanticcity, 4 pages, 2016, published prior to Jun. 24, 2016.
Paddy Power, "Live Casino," http://livecasino.paddypower.com/holdem, 2 pages, 2016, published prior to Jun. 24, 2016.
Parry, Wayne, "New Jersey Issues Rules to Allow Skill-Based Gambling," CDC Gaming Reports, 2 pages, Feb. 23, 2016.
Parry, Wayne, "Sneak Peek at Hard Rock Plans for Taj Mahal," The Associated Press, 3 pages, Jun. 9, 2017.
Pierceall, Kimberly, "Casinos Could See Guitar-Playing, Car-Racing, Card-Grabbing," Associated Press, 7 pages, Dec. 5, 2015.
Pierceall, Kimberly, "Skill-Based Slot Machines Inch Closer to Nevada Casinos," Las Vegas Sun, 3 pages, Sep. 3, 2015.
Povich, Elaine S., "State Gambling Revenues Take Hit From Millennials' Habits," TucsonSentinel.com, 4 pages, Sep. 15, 2015.
Preston, Marjorie, "Not So Random: Skill Games & the Casino of the Future," Global Gaming Business Magazine, 4 pages, Mar. 24, 2016.
Random $$ Slots, YouTube Video for "Race Ace & Centipede Slot Machines—Skill-Based Bonus From IGT (G2E)," https://www.youtube.com/watch?v=IkadUMiA6rc&feature=youtu.be, 3 pages, Oct. 2, 2014.
Reagan, Ronald, "America's Great Economic Miracle," 3 pages, Mar. 1, 1975.
San Manuel Casino, "Daily Login Bonus Terms & Conditions," https://play.sanmanuel.com/terms-and-conditions.shtml, 18 pages, Oct. 13, 2015.
San Manuel Casino, YouTube Video for "Konami's Frogger—Now at San Manuel," https://www.youtube.com/watch?v=A-0C86j8cog&feature=youtu.be, 2 pages, May 9, 2016.
San Manuel Indian Bingo & Casino, "About Us," https://sanmanuel.com/casino/about-us, 5 pages, Aug. 19, 2016.
San Manuel Indian Bingo & Casino, "Privacy Policy," https://sanmanuel.com/privacy-policy, 4 pages, Jun. 22, 2012.
San Manuel Indian Bingo & Casino, "Slots," https://play.sanmanuel.com/slots.shtml, 3 pages, Aug. 19, 2016.
San Manuel Indian Bingo & Casino, "Terms & Conditions," https://play.sanmanuel.com/terms-and-conditions.shtml, 24 pages, 2015.
Scientific Games, "Home," http://www.scientificgames.com/, 1 page, 2015.
Scientific Games Corporation, Press Release for "Scientific Games Reveals Exciting Innovations at G2E 2017," PR Newswire, 12 pages, Sep. 25, 2017.
Smed, Jouni et al., "Can We Prevent Collusion in Multiplayer Online Games," Proceedings of the Ninth Scandinavian Conference on Artificial Intelligence, 9 pages, Oct. 2006.
Spin Games LLC, "OurTechnology," http://www.spingames.net/our-technology/, 5 pages, 2016, published prior to Jun. 24, 2016.
Spin Games LLC, "Spin Games Awarded Patent," 4 pages, Apr. 17, 2014.
Staff Writer, "New Jersey Issues Rules For Skill Gaming," Casino Connection, vol. 13, No. 5, 2 pages, May 2016.
Staff Writer, "The Millennial Problem: Why We (Don't) Gamble," The Motley Fool, 18 pages, Sep. 19, 2015.
Stradbrooke, Steven, "Paradise Ent Inks IGT Technology Deal, Forces SHFL to Cry 'Uncle' In Patent Suit," CalvinAyre.com, 7 pages, May 7, 2016.
Stutz, Howard, "State Gaming Authorities OK Skill-Based Slot Machine Regulations," Las Vegas Review—Journal, Inc., 4 pages, Sep. 17, 2015.
Takahashi, Dean, "GSN's Sparcade Lets You Play Classic Arcade Games Like Pac-Man on Mobile for Real Money," VentureBeat, 3 pages, Jun. 8, 2016.
Twitch Interactive, Inc., "About Twitch," https://www.twitch.tv/p/about, 3 pages, 2016, published prior to Jun. 24, 2016.
Vice Media LLC, "eSports—Part 1," http://www.vice.com/video/esports-part-one, 4 pages, 2016, published prior to Jun. 24, 2016.
Vulcun, "Home," http://vulcun.com, 3 pages, 2015.
Wallace, Hannah, "GameCo Opens VGM Platform For New Game Developers," Casino Games Pro, 7 pages, Jul. 28, 2017.
Wargo, Buck, "Las Vegas Manufacturer Konami Wants to Grow Market Share," Las Vegas Review—Journal, Inc., 4 pages, Jun. 4, 2016.
Wheeler, Robert, "A Panoramic View of the Gaming Industry," Bally Technologies, European Gaming Compliance Technology Expo '08, 13 pages, 2008.
Wikipedia, "eSports," 14 pages, May 31, 2016.
Wikipedia, "Video Lottery Terminal," 4 pages, Nov. 1, 2015.
Wikipedia, "Xfire," 12 pages, Apr. 2016.
WMS Gaming Inc., "Home," http://www.wms.com, 1 page, 2015.
Xfire, "Home," http://www.xfire.com, 2 pages, 2016, published prior to Jun. 24, 2016.
Yogonet Group, Exclusive Interview with Blaine Graboyes, CEO, GameCo, 5 pages, Apr. 13, 2016.
Zacks Equity Research, "IGT Shows Portfolio Strength," 4 pages, Apr. 5, 2012.
Zarlengo, Philip, Master's Thesis for "Leveraging Slot Gaming Technology to Gain a Competitive Advantage," University of Nevada, Las Vegas, 43 pages, Fall 2011.
U.S. Appl. No. 16/901,256, filed Jun. 15, 2020, Systems and Methods for Multi-Player Electronic Card Game Play.
U.S. Appl. No. 17/073,959, filed Oct. 19, 2020, Interactive Gaming Systems With Artificial Intelligence.
U.S. Appl. No. 17/091,898, filed Nov. 6, 2020, Variable Payback Gaming.
U.S. Appl. No. 17/097,290, filed Nov. 13, 2020, Interactive Gaming Systems With Collusion Detection.
U.S. Appl. No. 17/101,730, filed Nov. 23, 2020, Electronic Gaming Systems and Methods.
U.S. Appl. No. 17/212,201, filed Mar. 25, 2021, Mechanisms for Detection of Gambling Rule Violations Including Assisted or Automated Gameplay.
U.S. Appl. No. 17/346,717, filed Jun. 14, 2021, Interactive Gaming in Licensed Locations.
U.S. Appl. No. 17/361,431, filed Jun. 29, 2021, Systems and Methods for Interactive Electronic Gaming With Rule Violation Detection.
U.S. Appl. No. 17/361,468, filed Jun. 29, 2021, Electronic Gaming Systems and Methods Having Variable Payout.
U.S. Appl. No. 16/933,249, filed Jul. 20, 2020, Location Based Restrictions on Networked Gaming.

(56) References Cited

OTHER PUBLICATIONS

U.S. Appl. No. 17/325,798, filed May 20, 2021, Location Based Restrictions on Networked Gaming.
U.S. Appl. No. 17/329,943, filed May 25, 2021, Location Based Restrictions on Networked Gaming.
Australian Patent Application No. 2022200378, Examination Report No. 2, 6 pages, Jul. 6, 2023.
Australian Patent Application No. 2022200378, Examination Report No. 3, 5 pages, Oct. 3, 2023.
Japanese Patent Application No. 2021-199005, Notice of Allowance, 3 pages, Sep. 5, 2023.
Australian Patent Application No. 2022200378, Examination Report, 7 pages, Mar. 28, 2023.
Decision Granting Institution of Inter Partes Review for U.S. Pat. No. 10,497,220, *DraftKings Inc.* vs. *AG 18, LLC,* IPR2022-01442, 38 pages, Mar. 14, 2023.
Decision Granting Institution of Inter Partes Review for U.S. Pat. No. 11,024,131, *DraftKings Inc.* vs. *AG 18, LLC,* IPR2022-01445, 33 pages, Mar. 14, 2023.
Decision Granting Institution of Inter Partes Review for U.S. Pat. No. 9,978,205, *DraftKings Inc.* vs. *AG 18, LLC,* IPR2022-01446, 43 pages, Mar. 14, 2023.
Decision Granting Institution of Inter Partes Review for U.S. Pat. No. 9,613,498, *DraftKings Inc.* vs. *AG 18, LLC,* IPR2022-01447, 57 pages, Mar. 14, 2023.
Decision Granting Institution of Inter Partes Review for U.S. Pat. No. 10,614,657, *DraftKings Inc.* vs. *AG 18, LLC,* IPR2022-01448, 47 pages, Mar. 14, 2023.
Patent Owner's Response to Petition to Institute Inter Partes Review for U.S. Pat. No. 10,497,220, *DraftKings Inc.* vs. *AG 18, LLC,* IPR2022-01442, 69 pages, Jun. 7, 2023.
Patent Owner's Response to Petition to Institute Inter Partes Review for U.S. Pat. No. 11,024,131, *DraftKings Inc.* vs. *AG 18, LLC,* IPR2022-01445, 67 pages, Jun. 7, 2023.
Patent Owner's Response to Petition to Institute Inter Partes Review for U.S. Pat. No. 9,978,205, *DraftKings Inc.* vs. *AG 18, LLC,* IPR2022-01446, 72 pages, Jun. 7, 2023.
Patent Owner's Response to Petition to Institute Inter Partes Review for U.S. Pat. No. 9,613,498, *DraftKings Inc.* vs. *AG 18, LLC,* IPR2022-01447, 41 pages, Jun. 7, 2023.
Patent Owner's Response to Petition to Institute Inter Partes Review for U.S. Pat. No. 10,614,657, *DraftKings Inc.* vs. *AG 18, LLC,* IPR2022-01448, 52 pages, Jun. 7, 2023.
Petition for Inter Partes Review of U.S. Pat. No. 10,497,220, *DraftKings Inc.* vs. *AG 18, LLC,* IPR2022-01442, 106 pages, Aug. 22, 2022.
Petition for Inter Partes Review of U.S. Pat. No. 11,024,131, *DraftKings Inc.* vs. *AG 18, LLC,* IPR2022-01445, 94 pages, Aug. 30, 2022.
Petition for Inter Partes Review of U.S. Pat. No. 9,978,205, *DraftKings Inc.* vs. *AG 18, LLC,* IPR2022-01446, 102 pages, Aug. 23, 2022.
Petition for Inter Partes Review of U.S. Pat. No. 9,613,498, *DraftKings Inc.* vs. *AG 18, LLC,* IPR2022-01447, 102 pages, Aug. 23, 2022.
Petition for Inter Partes Review of U.S. Pat. No. 10,614,657, *DraftKings Inc.* vs. *AG 18, LLC,* IPR2022-01448, 98 pages, Aug. 23, 2022.
Judgment Final Written Decision for U.S. Pat. No. 10,497,220, *DraftKings Inc.* vs. *AG 18, LLC,* IPR2022-01442, 76 pages, Mar. 12, 2024.
Judgment Final Written Decision for U.S. Pat. No. 11,024,131, *DraftKings Inc.* vs. *AG 18, LLC,* IPR2022-01445, 73 pages, Mar. 12, 2024.
Judgment Final Written Decision for U.S. Pat. No. 9,978,205, *DraftKings Inc.* vs. *AG 18, LLC,* IPR2022-01446, 102 pages, Mar. 12, 2024.
Judgment Final Written Decision for U.S. Pat. No. 9,613,498, *DraftKings Inc.* vs. *AG 18, LLC,* IPR2022-01447, 92 pages, Mar. 13, 2024.
Judgment Final Written Decision for U.S. Pat. No. 10,614,657, *DraftKings Inc.* vs. *AG 18, LLC,* IPR2022-01448, 111 pages, Mar. 12, 2024.
Japanese Patent Application No. 2021-203853, Notice of Allowance, 3 pages, Nov. 28, 2023.
Examination Report issued in CA Application No. 3,168,224 mailed Aug. 26, 2024, 6 pages.
U.S. Appl. No. 17/728,339 Final Office Action mailed Jul. 17, 2024, 22 pages.
U.S. Appl. No. 18/442,223 Non-Final Office Action mailed Aug. 27, 2024, 8 pages.
U.S. Appl. No. 18/649,514 Notice of Allowance mailed Nov. 6, 2024, 9 pages.
U.S. Appl. No. 17/361,468 Non-Final Office Action mailed Jan. 3, 2025, 13 pages.

* cited by examiner

PLAY-TO-EARN ELECTRONIC GAMING SYSTEMS AND METHODS

CROSS-REFERENCE TO RELATED APPLICATION(S)

This application is a continuation of U.S. patent application Ser. No. 16/907,954, filed Jun. 22, 2020, and issued as U.S. Pat. No. 11,302,141 on Apr. 12, 2022; which is a continuation of U.S. patent application Ser. No. 16/146,956, filed on Sep. 28, 2018, and issued as U.S. Pat. No. 10,692,325 on Jun. 23, 2020; which is a continuation-in-part of U.S. patent application Ser. No. 15/600,584, filed on May 19, 2017, and issued as U.S. Pat. No. 10,497,220 on Dec. 3, 2019; which is a continuation-in-part of U.S. patent application Ser. No. 15/444,409, filed on Feb. 28, 2017, and issued as U.S. Pat. No. 9,978,205 on May 22, 2018; which is a continuation of U.S. patent application Ser. No. 12/488,241, filed on Jun. 19, 2009, and issued as U.S. Pat. No. 9,613,498 on Apr. 4, 2017; which claims priority to U.S. Provisional Patent Application No. 61/074,572, filed on Jun. 20, 2008; all of which are incorporated herein by reference.

TECHNICAL FIELD

Various embodiments of the present technology generally relate to systems and methods for gaming. More specifically, some embodiments relate to systems and methods for skill-based gaming with location-based restrictions and/or customizations.

BACKGROUND

Skill-based games are, for example, games that allow users to compete for money or points either in a one-on-one manner or in a multiplayer tournament environment. These games differ from traditional gambling in that the games are based primarily on skill and are less influenced by chance.

Most skill-based games fall into four general categories:

Arcade/Video Games—Arcade games are games that involve quick fingers and quick thinking. These games are basically sped-up puzzle games. Arcade skill-based games include, but are not limited to, games based on football, basketball, car racing or other sports.

Puzzle Games—Puzzle games are games that rely on logic abilities and require the user to solve certain types of puzzles. While not as fast-paced as arcade games, these games often come with a time limit. Popular puzzle games include games that require modification of objects and their locations to create a particular result.

Word Games—Word games are games that are basically puzzle games using word problems, like rearranging letters to make words.

Trivia Games—Trivia games are games that test the user's knowledge of trivia in specific categories or in general.

Some skill-based games heavily modify the game play of "regular" casual games such as solitaire or in order to remove as many random events as possible. The analogy is that the influence of chance in a skill-based game should not exceed the influence of chance in any other pro sport competition, such as golf or football. For example, in a skill-based Solitaire competition, the players could be given the same cards in the same order so that the final score can be fairly compared.

Skill-based games have been, and continue to be, offered on internet websites where users are allowed to compete for points and/or money. Like poker sites, skill-based game sites can take a rake from peer-to-peer and tournament games, but unlike casino games or games of chance, the outcome of a skill game is predominantly determined by the user's skill level. Moreover, unlike traditional games such as poker, skill-based gaming is not offered in casinos or other closed system markets.

Although present devices are functional, they are not sufficiently accurate or otherwise satisfactory. Accordingly, a system and method are needed to address the shortfalls of present technology and to provide other new and innovative features.

SUMMARY

Exemplary embodiments of the present technology that are shown in the drawings are summarized below. These and other embodiments are more fully described in the Detailed Description section. It is to be understood, however, that there is no intention to limit the invention to the forms described in this Summary or in the Detailed Description. One skilled in the art can recognize that there are numerous modifications, equivalents and alternative constructions that fall within the spirit and scope of the invention as expressed herein.

Some embodiments of the present technology can provide a system and method for gaming (e.g., peer to peer gaming, real-money gaming, skin betting, eSports, skill-based gaming, etc.). In one embodiment, the present technology can include a method for peer-to-peer gaming. For one method, a plurality of game options are provided to a first player through a peer-to-peer gaming system. The first player can then make a game selection from the plurality of game options which is then received by the system. In some embodiments, the game options could include skill-based game options. In addition, the method could include providing to the first player a plurality of competitor player options, wherein the plurality of competitor player options includes at least a second player. The first player and the second player could also be provided with an interface to select a wager amount. The wager amount selection, and a corresponding wager, could be received from the first player and the second player. The first and second player could further be provided the game selection for game play. A game result could also be determined based on the first player's and second player's game play. This game result could also be received by the peer-to-peer gaming system. Based on the game result, the method could include providing a payout or credit to a winner determined by the game result.

In some embodiments, the wager amount can be a monetary wager amount and the credit to the winner would be a monetary credit. In some embodiments, the payout can be a prize (e.g., monetary prize, physical prize, vacation packages, car, electronics, etc.). Still yet, in some embodiments, the betting and/or payout amounts may be made in cryptocurrency, virtual currencies, or other ways that provide an exchange of something of value. The gaming system, in accordance with various embodiments may handle the exchange between two players playing in different currencies. In other embodiments, the payout may be in skins, crates, tokens or other items (physical or virtual) that can be exchanged in other marketplaces. As such, in some embodiments, the gaming system may support marketplace exchange features for the transfer of virtual items that can be transferred to separate systems. The creation, destruction, transformation, and/or ownership of the virtual items (e.g., bins, crates, prizes, skins, weapons, emojis, cards, characters, containers, etc.) may be managed with blockchain technology to effectively manage and track these items with immutable ledgers.

The gaming system, in one or more embodiments, may support betting (small or large) by others on the activity within the peer-to-peer or multiplayer game. This type of in-game betting or in-play betting can be supported by some embodiments. For example, if the players are playing a racing game, observers may place bets on which player will crash first, which player will win, which player will have the fastest lap time, etc. Similarly, some embodiments, may allow for parimutual betting on individual players or players that are part of a team, tournament, or other league (e.g., eSports). For example, the system may support fantasy eSports teams where various statistics and results are tracked.

Some embodiments can include a system for peer-to-peer gaming. In one example, the system could include a plurality of user interfaces, including at least a first user interface and a second user interface. These user interfaces could be connected to a peer-to-peer platform. In addition, the peer-to-peer platform could be connected to a game server, where the game server includes a plurality of game options. For one embodiment, the peer-to-peer platform could be configured to assist a first user at the first user interface in locating a second user at the second user interface. In addition, the peer-to-peer platform could be configured to assist the first user and second user agree upon a wager amount, and compete in one of the plurality of game options. In some embodiments, the first user and the second user compete in one of the plurality of game options for a prize amount wherein the prize amount comprises the wager amounts less a house take.

As previously stated, the above-described embodiments and implementations are for illustration purposes only. Numerous other embodiments, implementations, and details of the technology are easily recognized by those of skill in the art from the following descriptions.

BRIEF DESCRIPTION OF THE DRAWINGS

Embodiments of the present technology will be described and explained through the use of the accompanying drawings in which.

Figure 1:
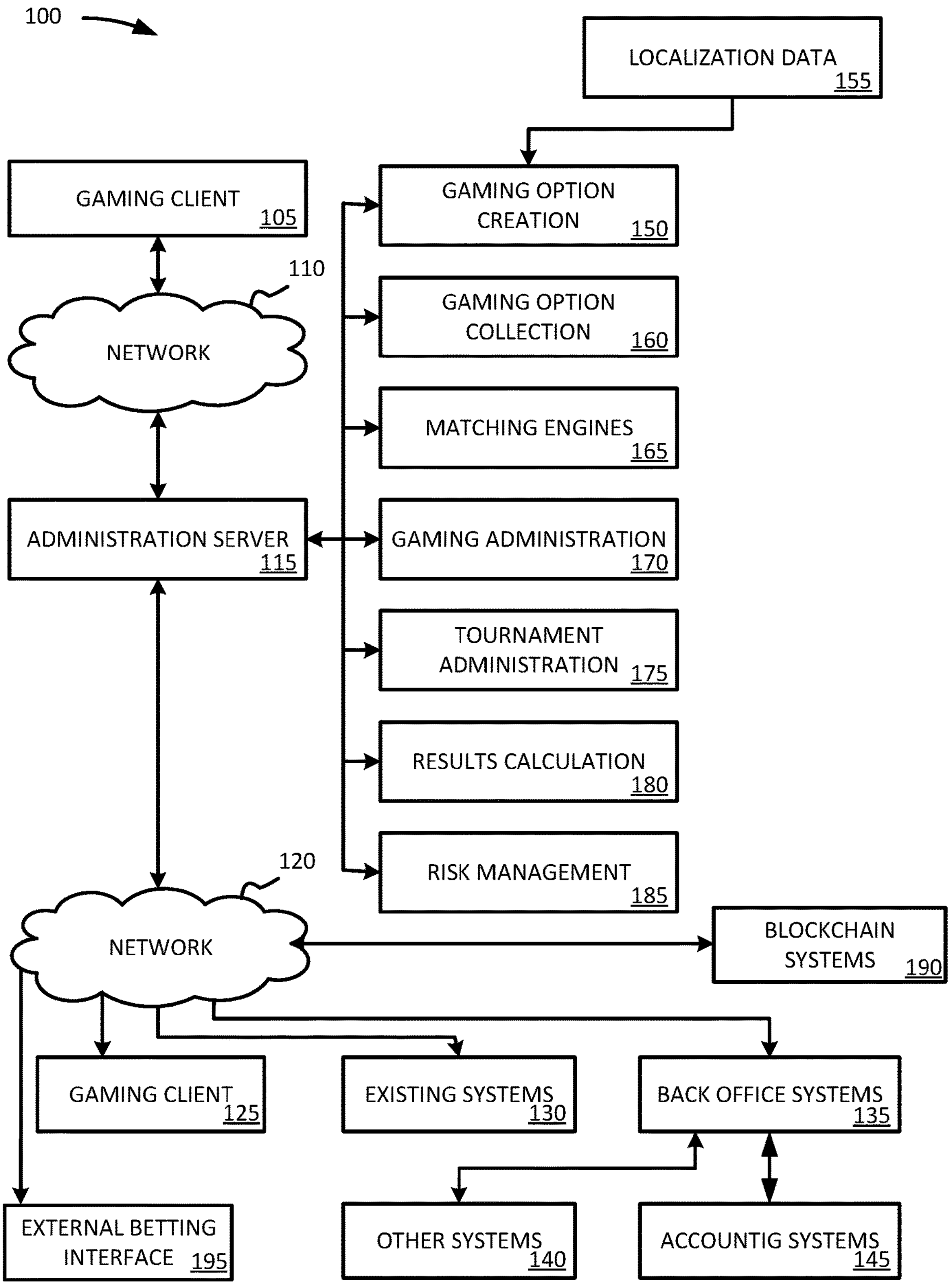
FIG. 1 illustrates a high-level network architecture of some embodiments of a system for peer-to-peer gaming.

The drawings have not necessarily been drawn to scale. For example, the dimensions of some of the elements in the figures may be expanded or reduced to help improve the understanding of the embodiments of the present technology. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology described herein is intended to cover all modifications, equivalents, and alternatives falling within the scope of the technology as defined by the appended claims.

DETAILED DESCRIPTION

Various embodiments of the present technology generally relate to interactive gaming systems. More specifically, some embodiments provide for techniques for location-based regulation and restrictions of interactive gaming systems. Some embodiments provide for a system comprising an at least one gaming client. The gaming client can be configured to accept a selection of at least one gaming option from a player, and allow the player to play a game based on the selection of the at least one gaming option. In some embodiments, the particular games, gambling currencies (e.g., virtual currency, real-money currency, cryptocurrency, etc.), betting amounts, and/or other options presented for selection by the player may change based on time and/or other criteria (e.g., location, player volume, licensing deals, type and/or capabilities of gaming client, etc.). Some embodiments can include an administration server configured to receive the selection of the at least one gaming option from the at least one gaming client, and initiate the game for the player based on the selection of the at least one gaming option. The system may also include at least one gaming server configured to run the game and transmit data about the game to the administration server.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to various network-based gaming devices, embodiments of the present technology are equally applicable to various other variations including multiple player devices and direct device to device game play.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases “in some embodiments,” “according to some embodiments,” “in the embodiments shown,” “in other embodiments,” and the like generally mean the particular feature, structure, or characteristic following the phrase is included in at least one implementation of the present technology, and may be included in more than one implementation. In addition, such phrases do not necessarily refer to the same embodiments or different embodiments.

Referring now to the drawings and in particular to the network layout in FIG. 1, it illustrates an embodiment of a high-level network architecture of some embodiments of the present technology. The arrangement illustrated in FIG. 1 is a logical arrangement and not meant to be an actual hardware design. Thus, the components can be combined or further separated in an actual implementation. As shown in the embodiments illustrated in FIG. 1, the network architecture can include one or more gaming clients 105, network 110, administration server 115, network 120, gaming server 125, existing system 130, back office systems 135, other systems 140, accounting system 145, gaming option creation module 150, localization data module 155, gaming option collection module 160, matching engine 165, game administration module 170, tournament administration module 175, results calculation module 180, risk management module 185, blockchain system 190, and/or external betting interface 195.

As illustrated in FIG. 1, gaming client 105 and administration server 115 are connected over network 110. Gaming client 105 represents the hardware and included software that is used by individual users, or players, who want to participate in various gaming sessions including various interactive gaming and peer-to-peer skill-based gaming session. For example, according to various embodiments of the present technology, a player could be provided, or use, a variety of clients such as touch screen kiosks, palmtops, PDAs, wireless tablets, smart phones, smart televisions, game top boxes, slot/video machines and/or other devices. In one embodiment, gaming client 105 can be a custom-built end-user interface that utilizes currently deployed equipment on the casino floor such as wireless handheld devices, kiosks, interactive TVs, smart phones, tables, laptops, or other electronic devices.

The interface of gaming client 105 can be customizable for visual consistency with an existing framework. For example, the interface could be adapted to run on an existing slot machine, video-based gambling machine, wireless device (e.g., laptop, smart phone, tablet, wearable, etc.) or other electronic devices. In one embodiment of the present technology, slot machine games can be run on gaming client 105 during certain periods of time, while allowing interactive or peer-to-peer gaming on the client at other periods of time. These periods may be set by a casino so that the available games change automatically during set time periods. In some embodiments, which games are available for play may be selected based on game selection criteria. For example, in some embodiments, the casino may make a deal with a game provider or other third-party to always have at least two gaming clients available for playing a particular game or group of games. As such, as players use the dedicated gaming terminals for that game the offering of other gaming clients may be changed so that the minimum available offerings are present.

For example, the types of games presented may be selected or customized based on various themes (e.g., sports themes, holiday themes, birthday themes, celebrations, etc.). For example, during the men’s basketball NCAA final four championships, more games may be presented that have a basketball theme. As another example, the games presented may be selected based on teams or schools that are participating in a sporting event on a particular weekend or day. Such customizations of games can apply to both the cabinet games being presented within the casino as well as mobile games that are available to players gambling on a mobile device.

In yet another embodiment, gaming client 105 could offer peer-to-peer gaming options, different slot machine type options and various other games for consumer choice. In some embodiments, players may be tracked (e.g., via room card, mobile device, etc.). Various analytics can be used to create custom profiles of the players. The profiles can be used to dynamically present customized gaming options on player terminals as the players engage or are in proximity. For example, the player may enter a room key or other rewards card or code. In other embodiments, the player’s phone may be able to communicate with player terminals or signs located on the casino floor. In response to the identification of the player different gaming options may be listed, customized, or presented first. In this way, casinos, hotels and similar establishments would be able to provide a high level of flexibility in gaming options, while simplifying the hardware and software infrastructure. Other options, variations and modifications are possible.

In FIG. 1, gaming client 105 is shown connected to the administration server 115 via a network 110. In one embodiment, network 110 could be a Local Area Network (LAN) limited to a single casino, hotel, or other establishment. In another embodiment, network 110 could comprise a Wide Area Network (WAN) linking numerous casinos within a gaming jurisdiction (e.g., the state of Nevada or an Indian Reservation). In yet another example, a LAN could be used to connect various casinos spaced relatively close together, such as in Las Vegas. Gaming client 105 and administration server 115 may be connected to network 110 through communications interfaces. This interface could be a network interface that is suited for network 110. The features and functions of this network will depend on where and how the system is implemented. Those skilled in the art will realize various modifications and variations consistent with the present technology.

In one embodiment, administration server 115 could be located in the same location as gaming client 105. In another embodiment, administration server 115 could be located in a remote location. In yet another embodiment, administration server 115 could be located in a central location with gaming client 105 at another location. The type of connection between the server and client, whether wireless or wired, on an Ethernet, etc., will vary depending on the implementation of the system. Those skilled in the art will be aware of many modifications and variations allowed by the present technology.

In FIG. 1, administration server 115 may also be connected to a variety of other systems such as, but not limited to, existing systems 130, back office systems 135, and gaming server 125 via network 120. Network 120 may be the same or different than network 110. Existing Systems 130 may include current casino gaming systems or payout systems. Back Office Systems 135 may include Accounting Systems 145 or Other Systems 140. Gaming Server 125 may contain multiple games that can be downloaded or run by gaming client 105. Note that gaming server 125 could be one server or a set of servers. Any of existing systems 130, back office systems 135, or gaming server 125 could be housed in one machine or across a number of machines. Those skilled in the art will be aware of many modification and variations allowed by the present technology.

There are many ways that the player could play a game on gaming client 105. In one exemplary embodiment, a game would be deployed on a client using an HTTP/web server and a web browser client. The HTTP/web server could communicate with the administration Server 115 and the server would serve/distribute the interface to each client using any available browser/client-side technologies like but not limited to: HTML, JavaScript, DHTML, AJAX, Flash, Shockwave, Java, Active X, Silverlight, or VBscript. In some embodiments, a customized client/server model could be used, where administration server 115 communicates to a server based application (an EXE and/or DLL, etc. . . . ), which would then communicate to a customized user-interface application (an EXE, etc. . . . ). In yet another example, a server-side application could be produced that would contain both the server-side functionality and the client side functionality, but then also provide client side interaction by emulating/replicating the client side interface out on to the gaming client 105. In some embodiments, gaming client 105 will not actually produce the interface. Rather, the client would present a series of images/interfaces that were transferred from administration server 115. This method's process is similar to a traditional terminal/emulator client-server application. In all of these cases, the player may receive a unique and customized interface.

The multitude of game distribution methods are required to be able to serve the varying types of games and their methods of game play and interaction. In one embodiment, gaming client 105 will include a universal controller (not shown) that allows the player to play various types of games using the same controller. In another embodiment, each type of gaming client 105 will have its own type of game controller options available. Gaming client 105 could further be identified by the user of gaming client 105. For example, administration server 115 may know gaming client 105 as a player gaming client or as a competitor gaming client. This list is not exhaustive and those skilled in the art will be aware of many modifications and variations allowed by the present technology.

Administration Server 115 is an open and flexible gaming platform that can be used for real money wagering in legal gaming jurisdictions like Nevada and Indian reservations. Similar to the Windows operating system, which can act as a base platform and accept and run many different types of applications, an open and flexible gaming platform can act as a base platform for skill-based, and chance-based, games created by various game developers (e.g., card game developers, skill-based game developers, chance-based game developers, etc.). The server can also be dynamically adjusted for localization requirements such as language, currency and legal issues.

As illustrated in FIG. 1, administration server 115 can include, or be communicably coupled to, a number of modules, such as: gaming option creation 150, gaming option collection 160, matching engine 165, game administration 170, tournament administration 175, results calculation 180, and risk management 185. Gaming option creation module 150 can take information from localization data module 155 to determine which games are available on administration server 115. The localization data can be provided as a packet that includes a variety of information, such as, but not limited to a device ID, player ID, a series of one or more location estimates (e.g., location estimate 1, location estimate 2, etc.), time stamp, confidence level, and the like. For example, in accordance with various embodiments, the location of the player may be determined using one or more location estimation techniques such as, but not limited to, IP address location estimation, geo-fencing, reports from a player terminal (e.g., where the location was identified using GPS), and/or other techniques. In some embodiments, manual check-ins by the player, video surveillance with facial recognition software, and information from other systems may also be incorporated into the location estimation.

Gaming option collection module 160 can collect a selection of gaming options. Matching engine module 165 can match players on the system. Game administration module 170 can oversee game play. Tournament administration module 175 can keep track of multiple games in a tournament. Tournament administration module 175 can keep track of winners in multiple games to showcase, display, or otherwise depict a scoreboard or leaderboard showing players and current scores or winnings in the current competition. Results calculation module 180 can calculate results from games and how to distribute winnings. Risk management module 185 can allow the system to adjust game play based on specific risk factors (e.g., latency, connection quality, speed of mobile processors, hardware configurations, skill level of players, dollar amounts being bet, security protocols, VPN speeds, detection of bots, robots or automated play, etc.). The server could consist of a single server or multiple servers. In some embodiments, gaming client 105 can communicate with the administration server 115 and gaming server 125 throughout the entire game play. Those skilled in the art will realize that many physical variations could be made to the number of devices used to create administration server 115.

After the game, paying winnings to the player can be done in a number of ways. Referring again to FIG. 1, a player could receive currency at an embodiment of gaming client 105. Additionally, a player could receive a "Ticket-Out" that can be turned in for cash or tokens that can be exchanged for cash or for play at another client. In one embodiment, such as a car racing game, a player could have selected a betting option such as $1/second-won-by. In this embodiment, there could be a constant interaction between gaming server 125 and accounting systems 145 to record live payout information. For example, if a player is 5 seconds ahead, he or she could have a monitor showing a $5 lead. As the lead changes, the monitor reflecting the monetary bet could also change. In this embodiment, the game could stop if a player's lead reaches a certain predetermined value, or if accounting systems 145 determine that the player's account only has sufficient funds to cover the current total. Many variations and modifications to completion and payout will be required by various betting types and gaming options. Those skilled in the art will be aware of modifications the present technology to account for these situations.

Blockchain system 190 can be used to track player activity, rewards, bets, payouts, and or other data. For example, some embodiments of the present technology allow for the creation, destruction, and/or merging of various virtual items (e.g., skins, crates, weapons, prizes, bins, paint jobs, digital items, virtual items, crypto collectables, non-fungible tokens (NFTs)). These virtual items may be created in a limited supply to increase demand within a marketplace or based on external sponsors who pay money for creation of limited virtual items. As such, as the items are created an entry is created in the blockchain system. The owner can be initially assigned to the system (or null) indicating that the gaming system can distribute the items per a set of rules (e.g., one award per day, random offer, etc.) which are part of, linked to, or referenced within the blockchain entry. Once ownership of the virtual item is transferred to the player a new blockchain is created indicating the change in ownership. Similarly, as the items are used, destroyed, combined with other virtual items, etc., blockchain system 190 can verify that the action is available or authorized and then create an updated or new entry within the blockchain ledger. Blockchain system 190 may also support cryptocurrencies (e.g., BITCOIN) for betting and receipt of winnings.

External betting interface 195 can support betting on the multi-player games currently going on. For example, external betting interface 195 can allow individuals other than the players to bet on the outcome of the game, the activity within the game (e.g., fastest lap, most kills, first to miss a shot, etc.), or other events. External betting interface 195 may require that these bets be small (e.g., $10 or less) or smaller than the amount bet by the players. In some embodiments, the touchscreens or physical interfaces for receiving the external bets may be part of the gaming client. In other embodiments, the external betting system may be supported on mobile clients that are in communication with external betting interface 195. The collocated interfaces maybe valuable for attracting bets within a casino while ordinary players are participating, the roaming mobile interfaces may be useful for higher profile gaming (e.g., eSports or ranked players competing). External betting interface 195 may also support fantasy eSports betting, parimutual betting on registered players or teams, and the like.

For purposes of discussion, the present technology primarily uses examples of systems and methods for skill-based gaming and skill-based games. This is in no way intended as a limitation of the present technology to only skill-based games. In some embodiments, the system can support skill-based games as well as traditional card games or other chance-based games. Even though Poker, in the strictest sense, is not a skill-based game, there are many advantages for setting up the system to be able to run Poker in addition to skill-based games. For example, given that Poker and other card games are well known and accepted in legal gaming jurisdictions, it is beneficial (although not required) for the system to be capable of serving as a platform for Poker style games. Moreover, by presenting a similar setup and feel to the skill-based platform for skill-based and Poker style games, the system seems more familiar to players, making it easier to transition to skill-based gaming.

Figure 2:
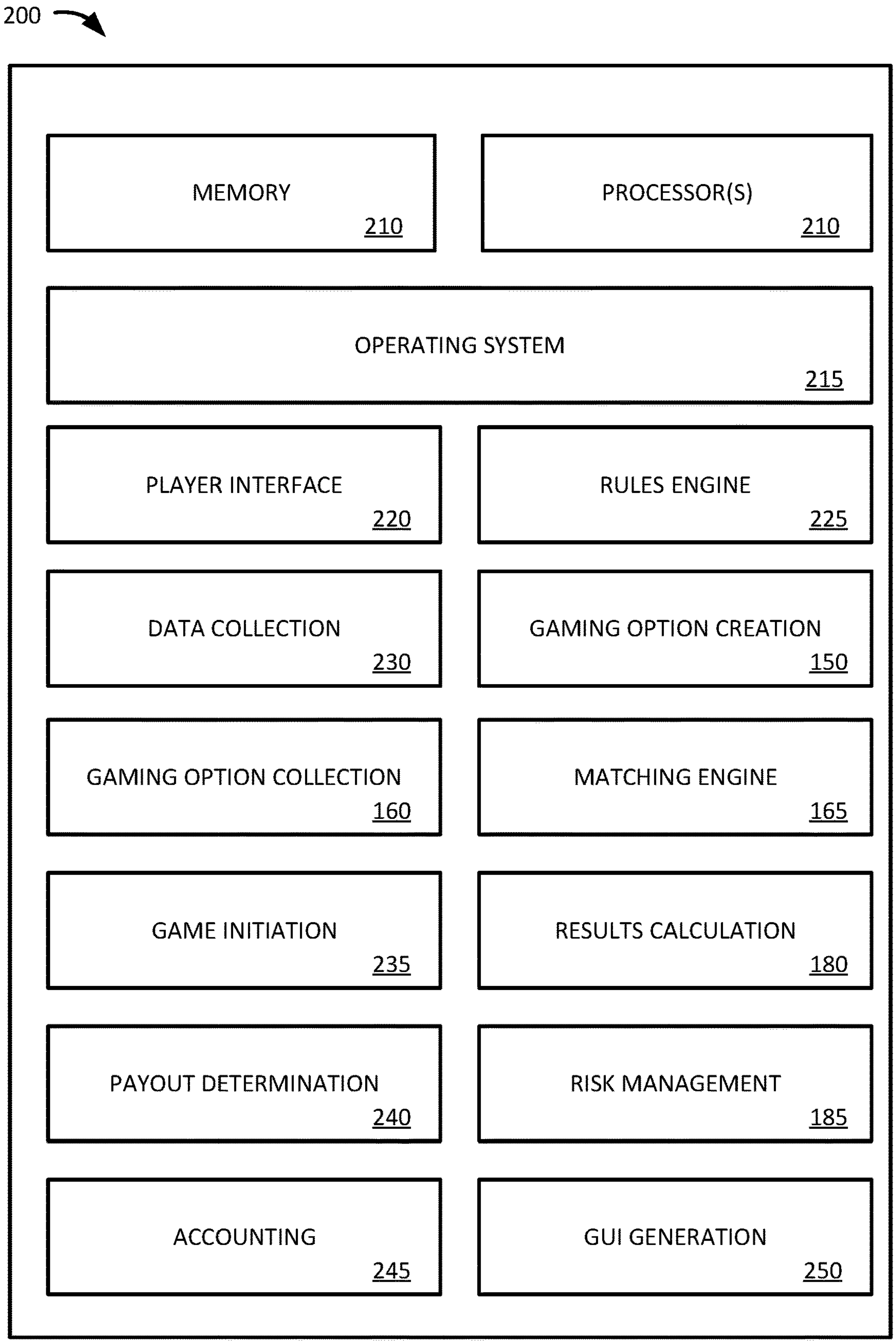
FIG. 2 illustrates a representation of software modules that could be used by and with a peer-to-peer platform consistent with various embodiments of the present technology.

FIG. 2 illustrates a set of components within, or associated with, administration server 115 according to one or more embodiments of the present technology. According to the embodiments shown in FIG. 2, administration server 115 can include memory 205, one or more processors 210, operating system 215, player interface 220, rules engine 225, data collection 230, gaming option creation module 150, gaming option collection module 160, matching engine 165, game initiation module 235, results calculation module 180, payout determination module 240, risk management module 185, accounting module 245, and graphical user interface (GUI) generation module 250. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. These modules are described according to their function and could be grouped differently. As those skilled in the art understand, many of these functions could be combined together into one software module and similarly, many of these functions could be divided into several different software modules. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, gaming option creation module 150 and gaming option collection module 160 can be combined into a single module for customizing gaming. The functional modules are discussed briefly with regard to FIG. 2 and in more detail with regard to the subsequent flow charts.

Memory 205 can be any device, mechanism, or populated data structure used for storing information. In accordance with some embodiments of the present technology, memory 405 can encompass any type of, but is not limited to, volatile memory, nonvolatile memory and dynamic memory. For example, memory 205 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of operating system 215, player interface 220, rules engine 225, data collection 230, gaming option creation module 150, gaming option collection module 160, matching engine 165, game initiation module 235, results calculation module 180, payout determination module 240, risk management module 185, accounting module 245, and/or GUI generation module 250. Operating system 215 provides a software package that is capable of managing the hardware resources of administration server 115. Operating system 215 can also provide common services for software applications running on processor(s) 210.

Player interface module 220 can be an input-output controller and serve as the interface for the player to interact with the other modules. In some embodiments, player interface module 220 can also direct communication from other modules to the client. For example, the module could present, among other things, game options to the player and the game itself. Rules engine 225, in accordance with some embodiments, can set forth various rules such as game selection timing, betting amounts, jurisdictional or location rules, and the like.

Data collection module 230 can collect various data about individual game player and the players. This data can be used to create player and gaming profiles, generate analytics, and as criteria for game presentation. In some embodiments, various machine learning techniques may be employed to identify gaming characteristics that attract certain players. Once identified, the gaming characteristics (e.g., color schemes, minimum betting amounts, types of games—arcade games, poker games, skill-based games, augmented reality games, virtual reality games etc.—location, etc.) can be dynamically changed on the player terminals within the casino.

Gaming option creation module 150 can be configured to create a list of the available game options. This module can use information about the location of the user, such as legal jurisdiction and casino location, to determine which game options are presented to the player. For example, in accordance with various embodiments, the location of the player may be determined based on IP addresses, geo-fencing, reports from a player terminal (e.g., where the location was identified using GPS), and/or other techniques. Player interface module 220 could access gaming option creation module 150 to present the player with a list of gaming options. For example, that list may include which games are available, such as Poker or 9-Ball, arcade games, card games, esport game, racing games, shooting games, board games, virtual reality games, augmented reality games, match 3, pinball, Tetris, Scrabble, 2 Dots, Angry Birds, and the like. The list may also include the wager amounts available for each game. This is not meant to be an exclusive list. A person having skill in the art will understand what other options would be appropriate.

Gaming option collection module 160 can be configured to collect a selection from the list of gaming options presented to the player. For example, gaming option collection module 160 could access player interface module 220 to receive which gaming options the player selected. This is just one embodiment of the present technology. Those skilled in the art will understand modifications and variations of the module consistent with the present technology.

Matching engine 165 can be configured to match players who wish to play a game together. It uses information obtained through the player interface module 270 to find players that are compatible. Matching is discussed later with respect to the subsequent flow charts.

Game initiation module 280 may be located outside of the embodiment shown in FIG. 2. If the game software is located outside the system, game initiation module 280 communicates information, including player information and player selected options, to the game software. The module also connects player interface module 270 with the game software. In the alternative, if the game software is located inside the system, game initiation module 280 can start a game. After a game has finished, or during game play, the module reports information about the game to the system. This information can be used later in calculating winnings and results.

Results calculation module 180, can (e.g., at the end of a game) determine which objectives each player achieved. This module can use information received from game initiation module 235 in order to determine the game result. In some games, the result is simple, such as each hand of black jack. In other games, such as football, the result may be more complicated. In some embodiments, results calculation module 180 will receive the final result. In other embodiments, results calculations module 180 will have to calculate the winner based on received game information.

Payout determination module 240 can (e.g., after the end of a game) determine whether each player may have some winnings. The operator of the game usually deducts an administrative fee before paying out winnings. This module takes information from results calculation module 180 to determine each player's appropriate winnings. Winnings could be in many forms, including, but not limited to: points, credits, virtual currencies (e.g., skins, crates, etc.), cryptocurrencies, or hard currency. After determining the amount of winnings due to the player, the payout determination module 240 can initiates a payout to the player. Depending on the type of winnings, the module may communicate to different systems. For example, if the player is to receive hard currency, payout determination module 240 may initiate another system (not shown) to produce coins for the player. Results calculation module 180 and payout determination module 240 can work together to tabulate the results of a game or set of games and pay out any winnings due to a player.

Risk management module 185 can monitor player activity in order to prevent collusion or other prohibited or illegal behavior. For example, risk management module 185 may use account information in order to determine if some players are violating rules of the system. In one embodiment, risk management module 185 could monitor playing behaviors of users to detect possible collusion. In another embodiment, risk management module 185 could determine which gaming options are available to the player. For example, in Solitaire tournaments where all players are given the same starting board, the module could monitor to see if a certain group of players are consistently playing in the same Solitaire tournaments. Similarly, in car racing games for more than two players, the module could monitor to ensure that a certain group of players are not consistently competing in the same races in order to work together and reach an unfair advantage.

In another embodiment, risk management module 185 may eliminate a player if the module detects prohibited behavior. For example, after a game, the risk management module may eliminate a player before giving the player any winnings. In another example, the module may eliminate the player during the game. None of these options are exclusive and risk management module 185 consistent with the present technology could include all or none of these example functions and could include other functions as well. Many variations and modifications of the functions of this module depending on the type of game and types of bets would be known to those skilled in the art based on the present technology.

Accounting module 245 can manage all bets, funds transfers and other accounting functions. The module could take care of debiting and crediting a player's account. In an embodiment of the present technology, even receipt of funds from the player to start a game could be monitored by the Accounting module 245. In yet another embodiment, payout determination module 240 may direct the accounting module 245 to credit the player's account.

GUI generation module 250 can generate one or more GUI screens that allow for interaction with a user or administrator. In at least one embodiment, GUI generation module 250 can generate a graphical user interface allowing a user to set preferences, review reports (e.g., from risk management module 185 or accounting module 245), author custom reports, set device constraints, and/or otherwise receive or convey information about various gaming activity to the user. The examples provided herein are exemplary only. The explanation of these modules and their uses are merely indicative. A person skilled in the art will recognize additional variations and embodiments.

Figure 3:
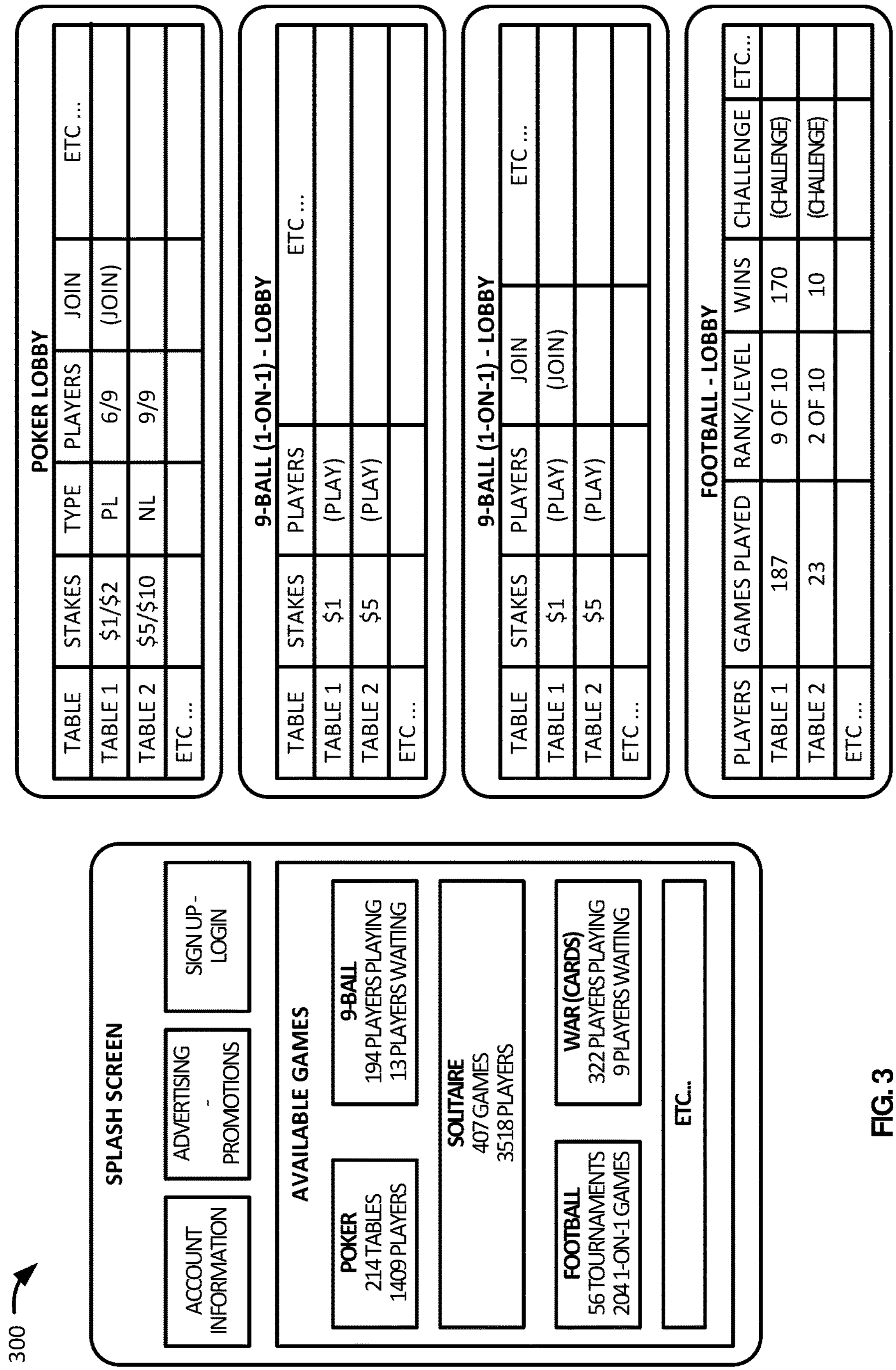
FIG. 3 illustrates examples of user-interface screens consistent with one or more embodiments of the present technology.

FIG. 3 illustrates examples of user-interface screens consistent with one or more embodiments of the present technology. In the embodiments illustrated in FIG. 3, a player could select both the game and stakes at the same time. If a player wants to play 9-Ball, he or she could select that game and the stakes he or she wanted to play at ($1 or $5). The screens shown in FIG. 3 could be separate screens or a player could be provided with numerous different games all within a specific betting range. Additional variations and embodiments would be realized by one of skill in the art.

Figure 4:
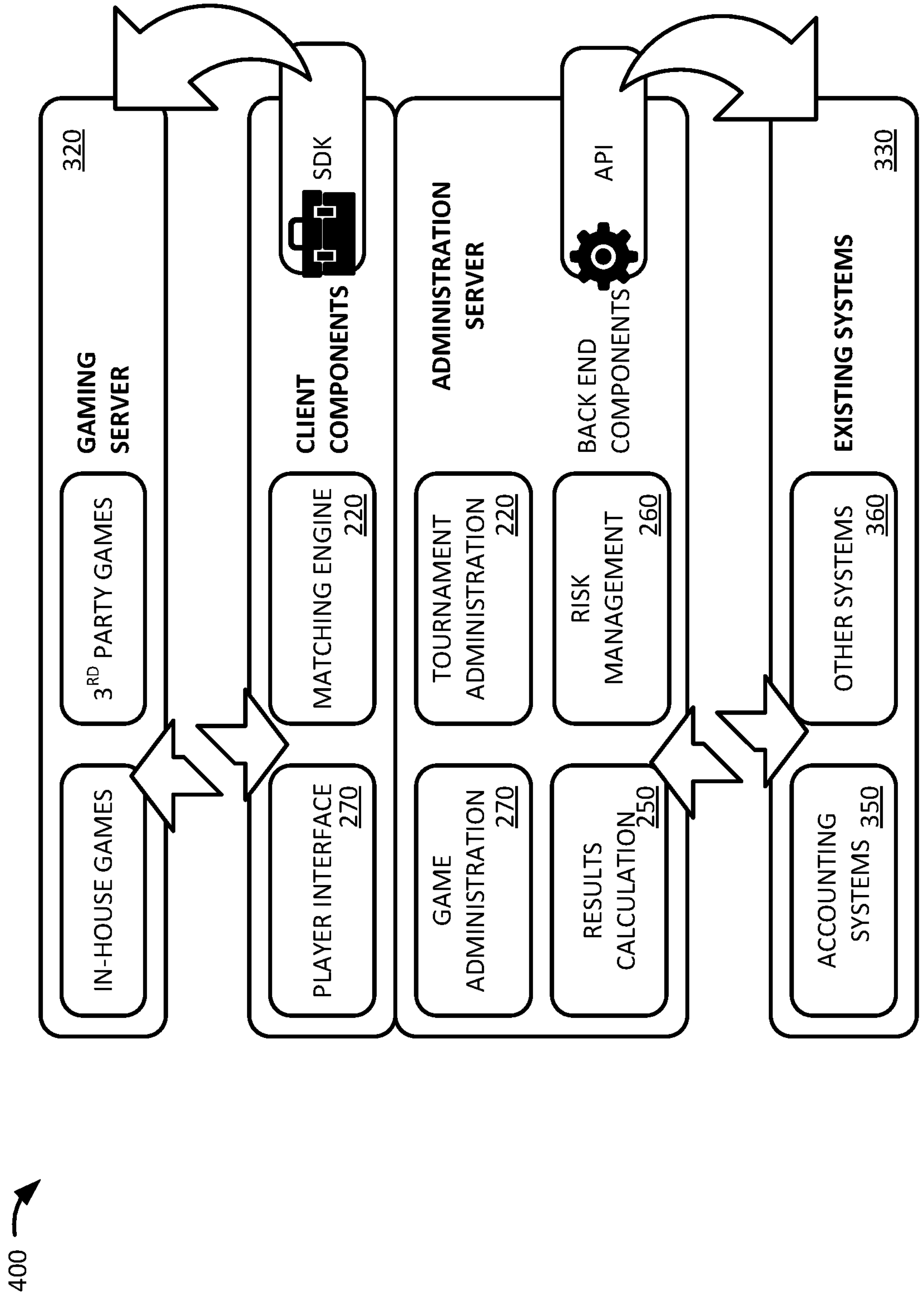
FIG. 4 illustrates another example of a representation of software modules that could be used by and with a peer-to-peer platform consistent with some embodiments of the present technology.

FIG. 4 illustrates another example of a representation of software modules that could be used by and with a peer-to-peer platform consistent with some embodiments of the present technology. FIG. 4 represents a functional combination and not intended to be an actual network design. The figure shows a different combination of the functional modules described in FIGS. 1 and 2. Again, this embodiment is not intended to be limiting, but rather is intended to further explain an embodiment of the technology.

Note that the embodiments displayed in FIGS. 1, 2 and 4 are different embodiments of the present technology. Those having skill in the art will understand possible variations of the technology beyond these embodiments.

Overview of System

Figure 5:
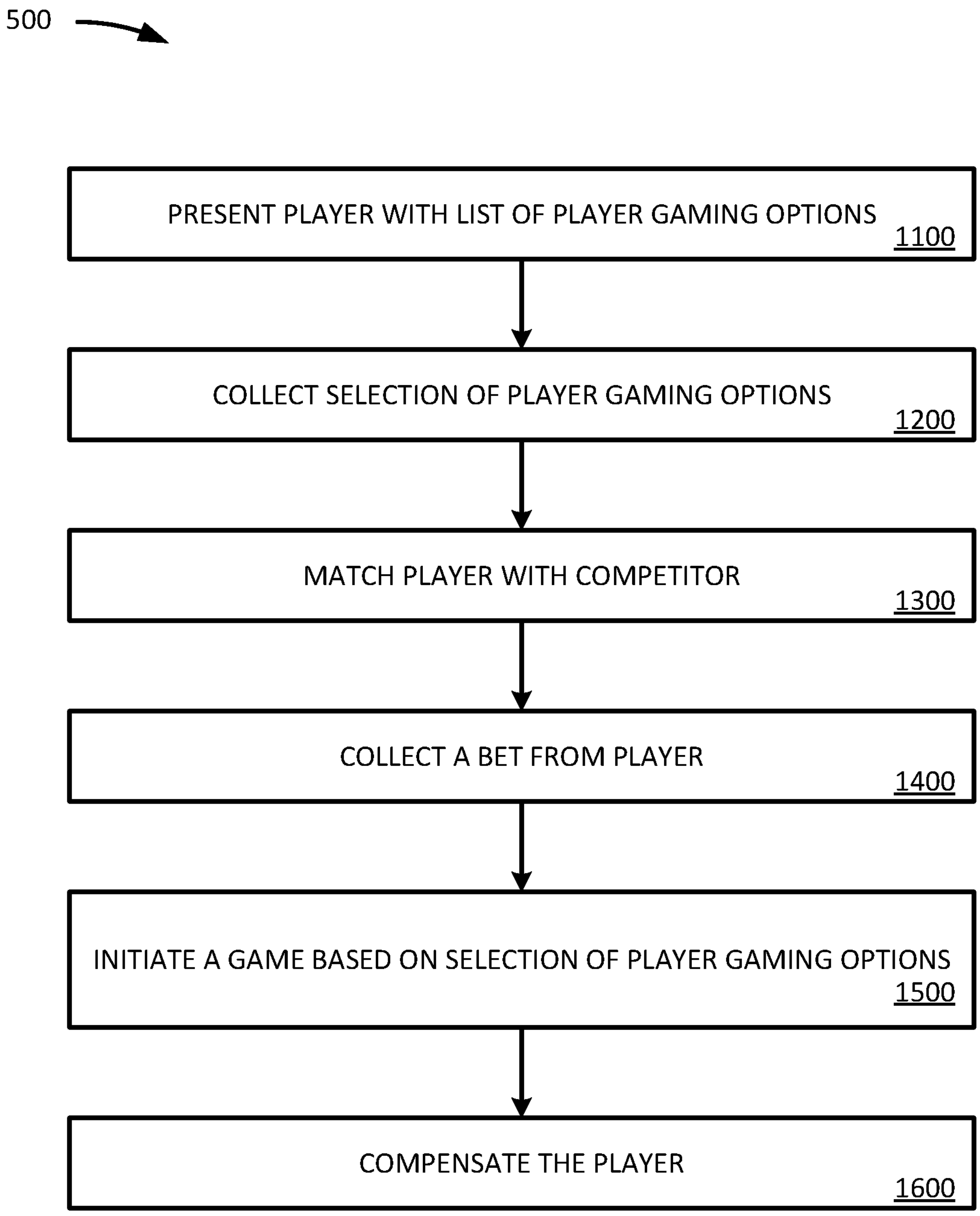
FIG. 5 illustrates one method by which a system could implement peer-to-peer gaming consistent with various embodiments of the present technology.

In FIG. 5, a flow chart represents broadly one method by which the present technology can conduct a game for a player. First, the system presents a player with a list of player gaming options 1100. Once the player has made a selection from the list of player gaming options, the system collects that selection 1200. The system then matches the player with a competitor 1300 and collects a bet from the player 1400. Next, the system initiates a game based on the selection of player gaming options 1500. Finally, after the game has completed, the system compensates the player 1600. It is not necessary that the steps run in this specific order. The steps may run out of order or be run in a loop. Additionally, the set of steps may run in a loop inside the larger method. Finally, this listing of steps is not exhaustive. Another embodiment consistent with the present technology may have a more steps or less steps. Those having skill in the art will understand possible variations of the technology beyond these embodiments.

Gaming Options

Gaming options are the parameters for a game. The system uses the gaming options to initiate the game for the player. For example, gaming options may include: a game type, such as Poker, 9-Ball, chess, or a football arcade game; a bet amount for a particular game type, such as $5 or 10 points; a specific competitor to play against, where the competitor may be identified in many ways, including but not limited to: console location, account name, nick name, or record; or even a preset game, complete with bet and game type, such as a game of chess with a $5 jackpot. This is not meant to be an exhaustive list. A person having skill in the art will understand what other gaming options are consistent with the present technology.

In one embodiment, a set of gaming options presented to a player could be referred to as Player Gaming Options, whereas a set of gaming options presented a competitor could be referred to as Competitor Gaming Options. These references are not limiting. Those skilled in the art will understand how to refer to different sets of gaming options.

Figure 11:
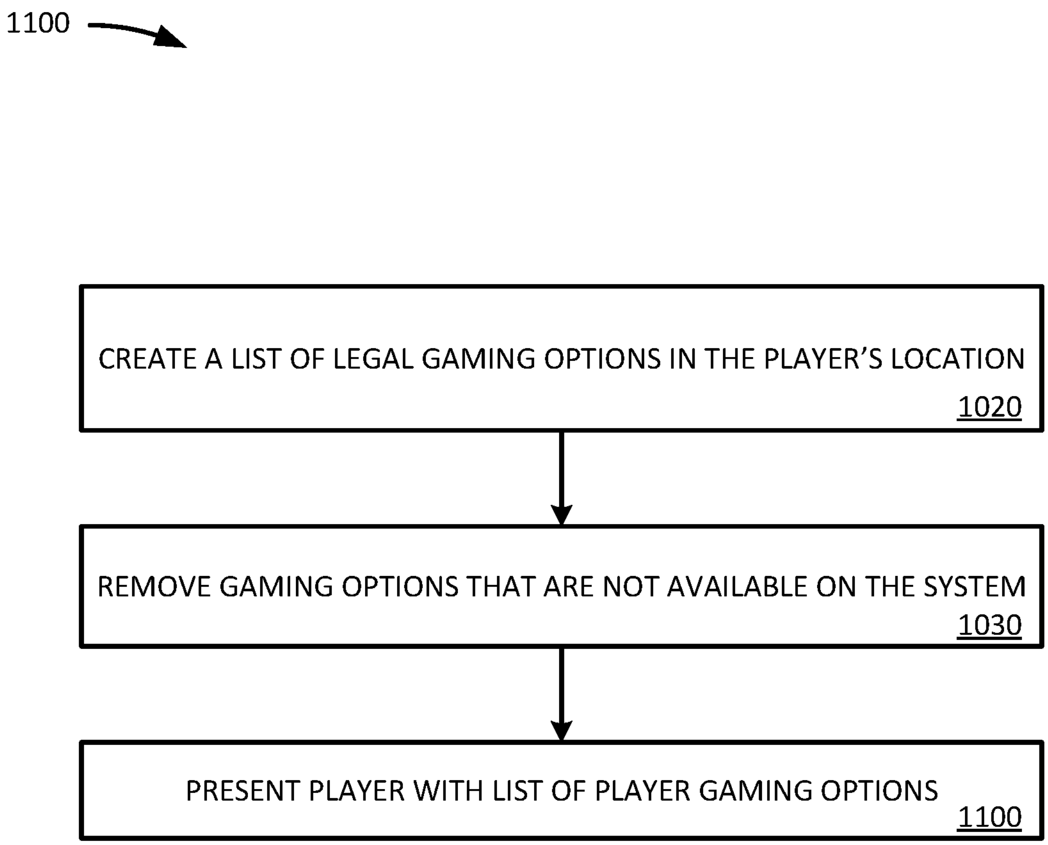
FIG. 11 illustrates one method by which a system could create a list of available gaming options for a player in a system of peer-to-peer gaming consistent with one or more embodiments of the present technology.

Before presenting a player with gaming options, the system determines which gaming options are available to the player. Referring to FIG. 11, the system could first create a list of legal gaming options in the player's location 1020. The list of legal gaming options might include limits on wagers or types of games allowed, such as a $100 per hand limit on poker or a prohibition on any game except slots. For example, if the jurisdiction does not allow real-money gambling (i.e., a zero dollar per hand limit), the game may allow the player to use virtual currency, cryptocurrency, virtual goods (e.g., skins, crates, etc.). The system then could remove any gaming options that are not available on the system 1030. Some operators of the system may wish to establish a minimum or maximum betting amount or may or may not have a license for certain games such as a Football game. If the system is not authorized to offer a type of game, then the player will not be able to select that type of game as a gaming option. Once the system has determined the list of available gaming options, it presents the player with the list of player gaming options 1100.

Figure 12:
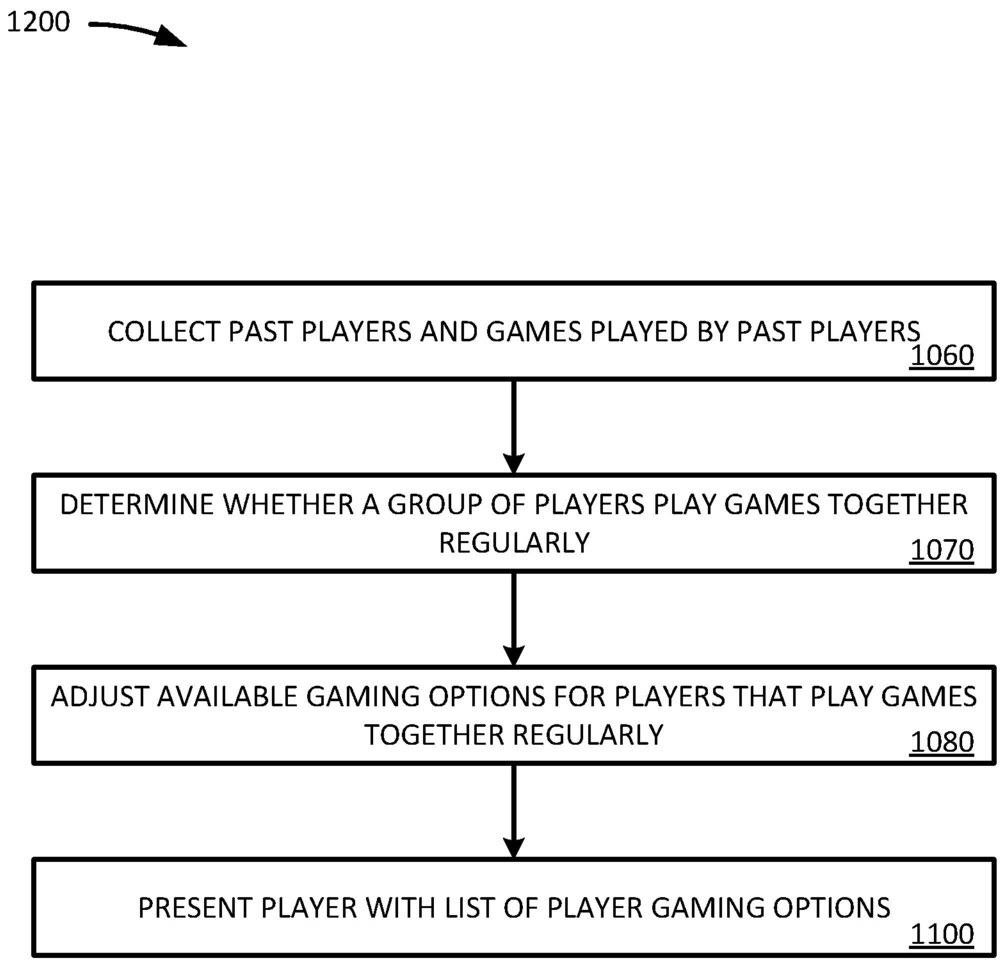
FIG. 12 illustrates one method by which a system could modify the list of available gaming options for a player to reduce risk in a system of peer-to-peer gaming consistent with some embodiments of the present technology.

While determining gaming options, the system may manage risk by modifying the available gaming options based on the possibility for a player acting illegally or in a prohibited way. The system may determine that a number of players are sitting near each other and will limit the ability to play a collaborative game among those players. Further, the system may keep records of past players based on data entered by a player, such as account information or other identifying features, such as a frequent player card, a scanned driver's license, or a scanned credit card. This list of entered data is not exhaustive. Those skilled in the art will understand how to receive identifying information about a player. For example, referring to FIG. 12, the system could first collect past players and games played by past players 1060. It then could determine whether a group of players play games together regularly 1070. If a group does play together regularly, the system can adjust the available gaming options 1080. Finally, the system will present the player with a modified list of player gaming options 1100.

Gaming Option Selection

After a player is presented with a list of gaming options, the player selects from the list of gaming options to start a game. The steps by which a player selects from the list of gaming options can be varied. The options herein described are merely exemplary; there are other orders in which a player can be presented with, and select from, a list of gaming options.

In an embodiment, a player could first select the player's preferred game type and then be presented with a list of competitors who are also interested in playing that game type. In another embodiment, a player could select a general category, such as a Sports Type Video Game category, and be presented with a list of competitors who are interested in that category of game types. After selecting the game type or game category, a player may be provided the opportunity to challenge another individual player in a heads up one-on-one (peer-to-peer) match where the competitive environment is a skill-based game. The game could be anything from Solitaire to Chess to Football.

In yet another embodiment, a player could select to play a series of games. For example, if a player considered himself or herself well-rounded in many different games, that player could challenge a competitor to a best two out of three where each game is a different skill-based game. A player could also play a best two out of three using the same skill-based game. In yet another embodiment, instead of a series type competition (best two out of three, best three out of five, etc.) the competition could be based on a total number of points between a multiple game competition. For example, if players are playing Pong, each player could agree that the player with the highest point total after two events (rather than just one) is the winner. Many alternatives consistent with the present technology will be realized by those skilled in the art. Variations on how to group players (such as by skill level or experience or participation in an ongoing tournament) could also be used.

In yet another embodiment, the system could provide a player with the ability to play the computer in a game of the player's choice (for a fee, or for free) while the player waits for competitors willing to compete.

In addition to the game and competitor, gaming option selection could include betting ranges. Betting ranges could be pre-selected options by the system, in which case, a player will select a betting range. In the alternative, a player could be allowed to select his or her acceptable betting ranges. The betting ranges may also be determined by external factors, such as house stakes and local laws.

It is not necessary for a player to pick every possible gaming option for each game. In certain embodiments, a player may only pick one gaming option.

Matching

In order to participate in a peer-to-peer competitive game, a player needs a game to play and a competitor. Referring again to FIG. 5, the system could select a betting range before presenting the player with a list of player gaming options 1100, or the player could select a betting range when the system collects the selection of player gaming options 1200. For example, a player could first select a betting range and then be presented with a list of competitors in that betting range. In another example, a player could select a game to play, then a betting range, and then be presented with a list of competitors willing to play the same game for similar amounts. Those skilled in the art will realize many variations to the order of the steps consistent with the present technology.

Figure 8:
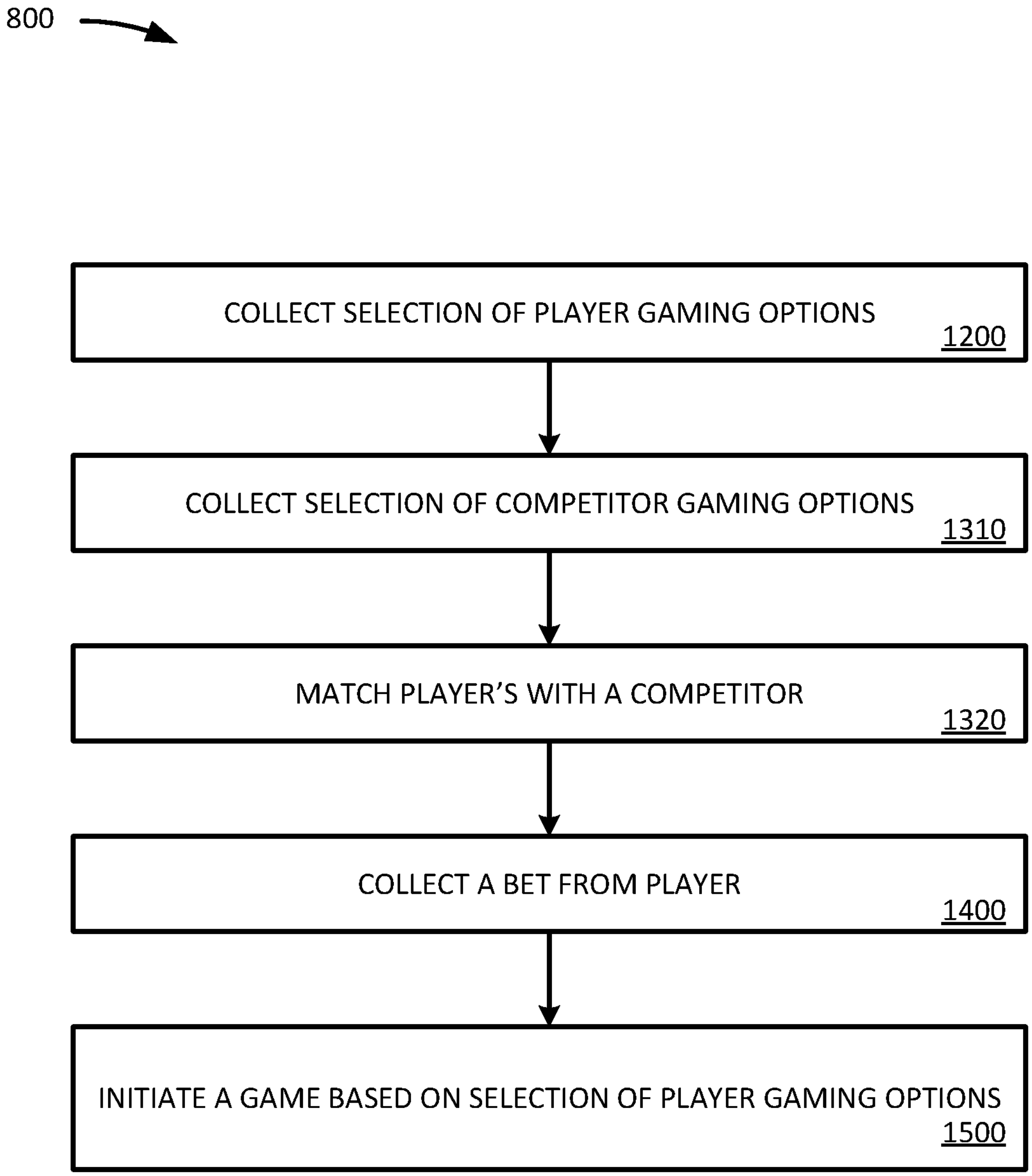
FIG. 8 illustrates one method by which a system could implement peer-to-peer gaming consistent with one or more embodiments of the present technology.

In one embodiment, referring to FIG. 8, after collecting the selection of player gaming options 1200, the system could collect at least one selection of competitor gaming options 1310. The system would then match the player and competitor based on their respective gaming options 1320 before collecting a bet from the player 1400 and initiating a game based on the selected gaming options 1500. The system would match the player and the competitor if their selections were compatible. In one embodiment, a player's and at least one competitor's selections would be compatible if their selections were identical. In another embodiment, a player and at least one competitor would be compatible if their selection of gaming options were closely related. In yet another embodiment, the system would create a list of compatible competitors. The list of compatible competitors would include all of the at least one competitors that are compatible with the player. Those skilled in the art will understand the many variations of matching players with competitors consistent with the present technology.

In an embodiment where players are allowed to select their own acceptable betting ranges, the system would automatically determine what players have betting ranges that overlap so that players are given a list of player gaming options that include options to play competitors who are willing to play for an acceptable amount.

In another embodiment, a player could select a betting range before selecting a game and/or competitor. For example, a player who is willing to risk less could select a lower betting range such as $5-$50 so they know he or she will find competitors willing to play for lower amounts. Conversely, a player who is only interested in playing for larger amounts could select a higher betting range such as $200-500. The betting ranges presented here are exemplary only. One skilled in the art will realize that betting ranges could vary and a betting range could be single value rather than a range of values (e.g., players willing to bet $10, players willing to bet $20, etc.).

Negotiation

The present technology can also allow a player and competitor to negotiate with each other, through the system, to determine how much to bet before playing. The bet could be of any value including a points style bet or a financial bet (e.g., money bet). In some embodiments, a player and competitor will negotiate the bet before playing the game. This may be facilitated through communication channels (e.g., video chat, chat room, instant messaging, etc.) hosted by the gaming system. In some embodiments, player profiles and rankings may be presented to each other. A history of game play between the players may be presented showing historical win rates, last game played, and the like.

Figure 9:
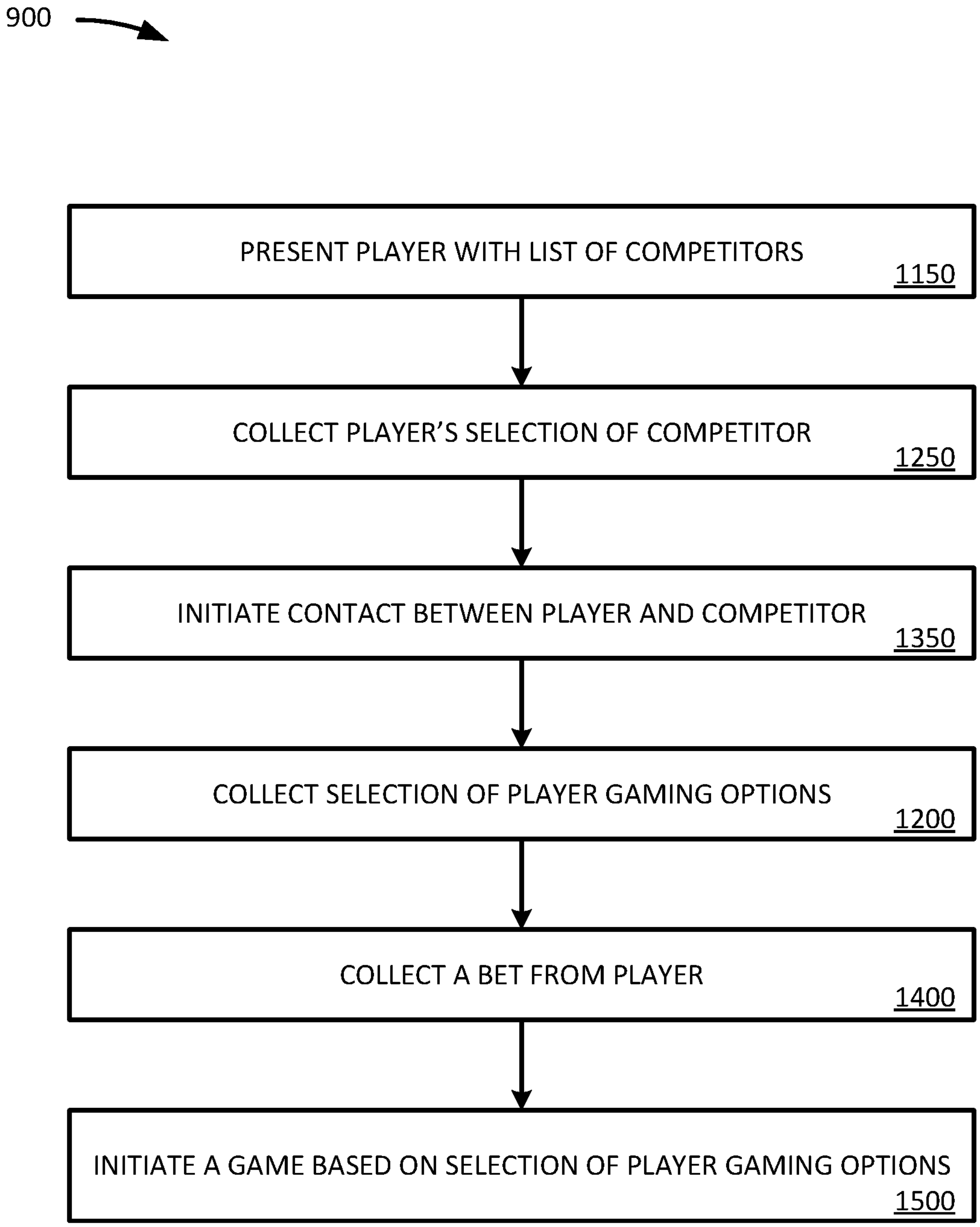
FIG. 9 illustrates one method by which a system could match compatible players and competitors in a system of peer-to-peer gaming consistent with some embodiments of the present technology.

In one embodiment, represented in FIG. 9, a player is presented with a list of competitors 1150. After the system collects the player's selection of a competitor 1250, the system initiates contact between the player and the selected competitor 1350. Once contact is initiated, the player and competitor can negotiate selected gaming options (not shown). This negotiation may fail and the player can restart the process. If the player and competitor come to an agreement, the system collects the selected player gaming options 1200. Finally, the system collects a bet from the player 1400 and initiates a game based on the selection of player gaming options 1500. For example, in such an embodiment, the system could present a new player with competitors waiting for a game. This presentation may include chatting (e.g., video chat, text-based chat, etc.) capability such that individuals can stir up competition. In addition, it may provide a list of competitors such that a returning player can locate familiar names and challenge those individuals. Similarly, as shown in FIG. 3, the system could provide a list of competitors with varying ranks and experience and allow a player to challenge a given competitor. In addition, two players who have been competing in one type of skill-based game (such as a sports type video game) could decide to keep competing against each other but in a different skill-based game (such as a more intellectual type game such as Chess or a different type of video game).

In another embodiment, a player could negotiate the wager they wish to compete for. In some embodiments, a player would negotiate the money they wish to compete for. In other embodiments, a player could negotiate for points or some other non-monetary value. In this embodiment, the interface will allow a player and competitors to communicate back and forth until they come to an acceptable bet. A player could be limited to betting within the original range they selected, or could be given the ability to negotiate for any amount.

In yet another embodiment, a player could negotiate the amount of points they wish to compete for. This could be used in, among other things, a tournament style of play where all players are originally assigned an equal number of points and the last player standing, or the player with the most points after a certain amount of time, wins. Many points styled tournaments or competitions could be imagined by those skilled in the art consistent with the present technology.

Funds Receipt

Once the bet has been determined, the agreed upon bet can either be deducted from the players account (this includes either points from a points account or money from a cash account), or money can be deposited into a "Cash In" device as the form of payment for the game. In addition, in some embodiments, the "Cash In" device could accept tickets from "Ticket Out" devices that could have been turned into cash. In another embodiment, the device could accept tokens. Still yet, the device may accept credit cards or electronic payment methods such as, but not limited to, electronic transfers, electronic wallets, electronic accounts, near-field communications, cryptocurrencies, bitcoins, etc. The ability to use the "Cash In" device allows for individuals to play the system without having to register or set up an account. Alternatively, by registering or setting up an account, players would have greater flexibility in using the system. Incentives, such as frequent player bonuses, could be established to help promote registration and player loyalty. In addition, registration may be required for certain types of tournaments or games, such as to prevent collusion or in order to track payouts for tax purposes or other legal issues.

Referring again to FIG. 5, in one embodiment, the system collects a bet from a player 1400 before initiating a game 1500. This is not meant to be limiting. The system may collect funds at a different point in the process. The system may also work off of an account, as discussed above. Those skilled in the art will realize many variations to the order of the steps and methods consistent with the present technology.

Game Play

Figure 7:
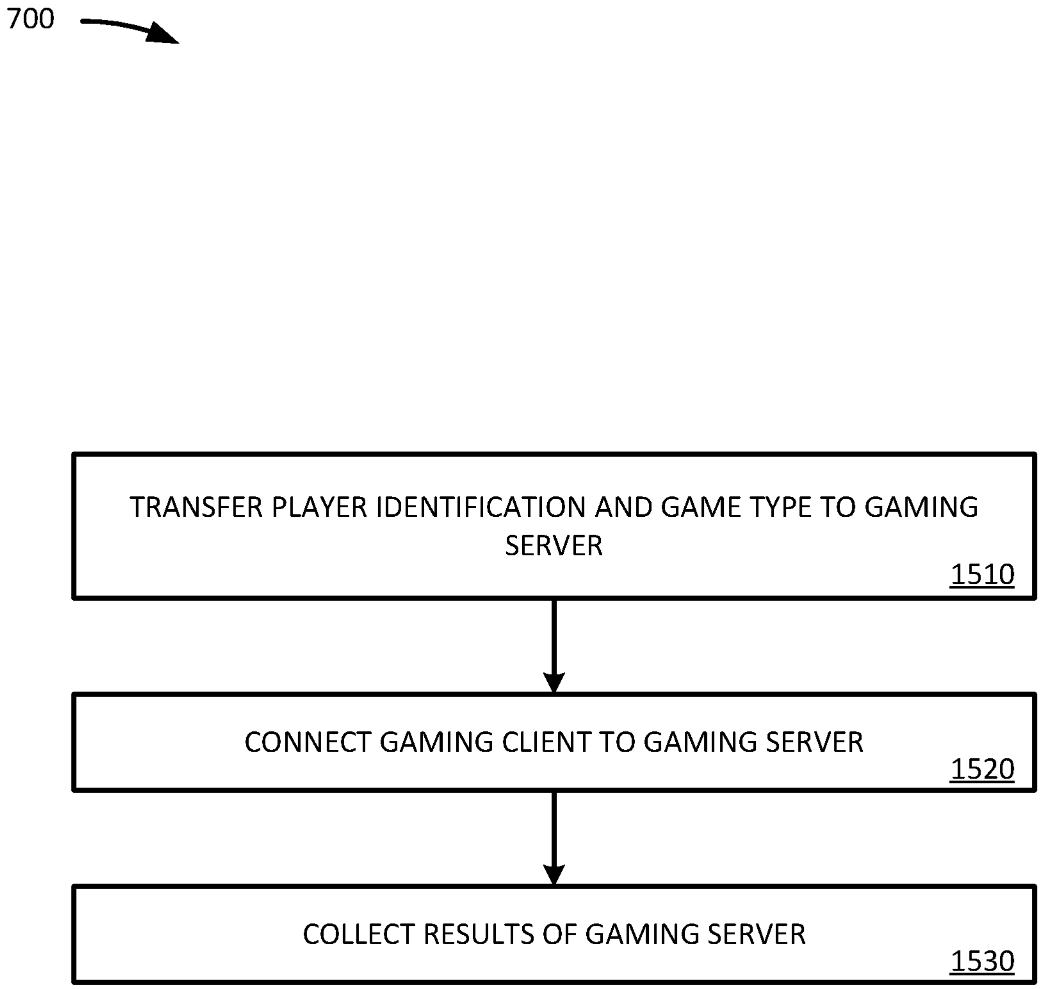
FIG. 7 illustrates one method of initiating a game for a player that may be used in various embodiments of the present technology.

The methods in which a game can be rendered to a player via a user interface device can be accomplished in many different ways. Referring to FIG. 7, the system transfers player identification and at least the game type to the gaming server 1510. Then the system connects the player gaming client and gaming server 1520 so that the player can play the game (not shown). As the game is running or once the game is complete, the system collects results from the gaming server 1530. This information will be used to determine results and any possible winnings. Player identification could be the player's account, identification of the console that the player is operating, or other identifying information. This list of possible player identifications is not exhaustive. Those skilled in the art will understand variations of player identification consistent with the present technology.

In another embodiment not shown, the system also transfers competitor identification to the gaming server. The system then connects the competitor gaming client to the gaming server. The types of competitor identification would be the same as player identification.

In another embodiment not shown, the system includes a module to run the game. The gaming client is initially connected to the system during option selection and the system initiates the game by running the game itself. In this way, there is no communication with an external gaming server.

Completion and Payout

Figure 6:
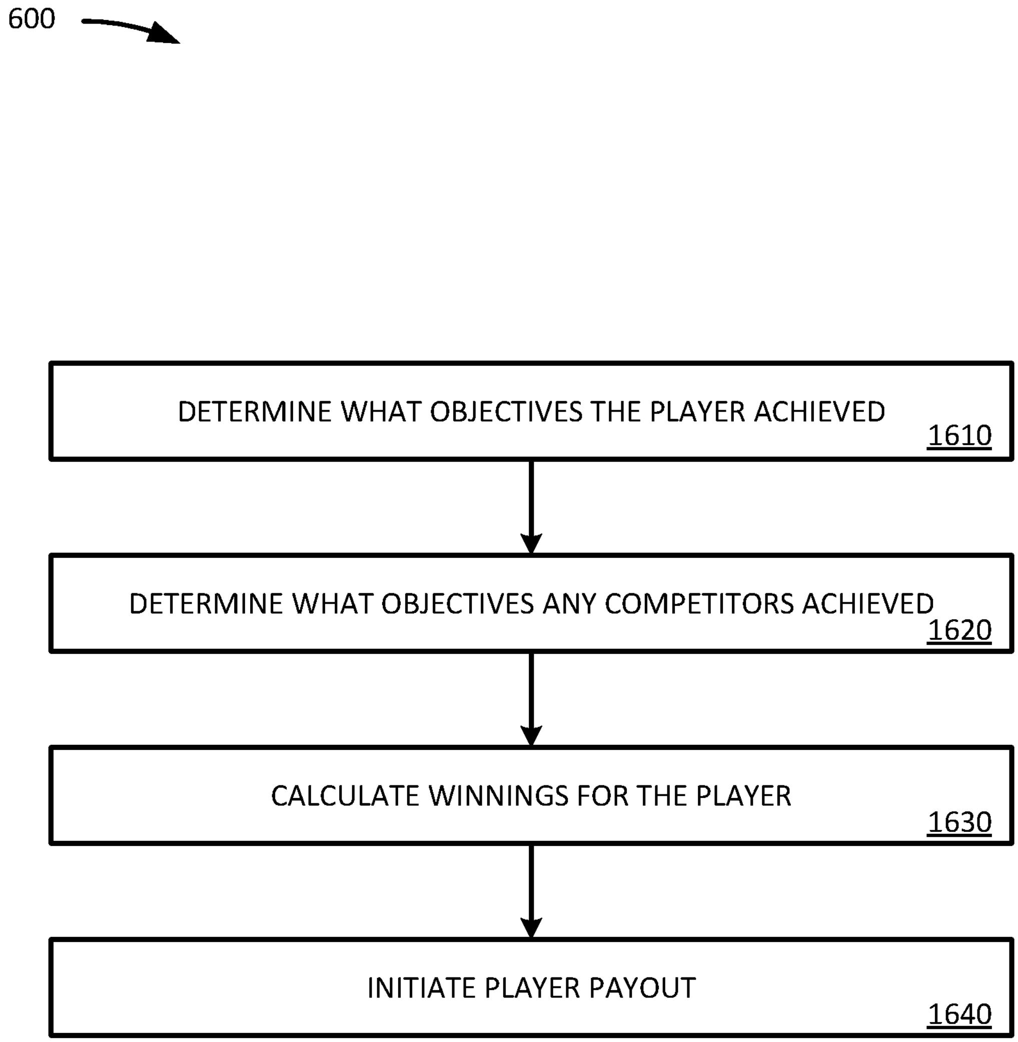
FIG. 6 illustrates one method of determining and paying a player's winnings after a game has been played that may be used in some embodiments of the present technology.

Now referring to FIG. 6, to compensate the player, the system first determines which objectives the player achieved in the game 1610. Then it determines which objectives any competitors achieved in the game 1620. The system then calculates any winnings for the player 1630 based on objectives achieved and other information, including but not limited to: the rules of the game, location-based restrictions on payouts (e.g., real-money allowed, limits on real-money payouts, virtual currency allowed, only virtual currencies such as skins, bins, and crates, etc.) and any selected gaming options. Once the amount of winnings is calculated, the system initiates payment 1640. In order to effect payment, the system may compensate a player with tokens, a "Ticket-Out," real money, cryptocurrency, game item (e.g., skin, crate, containers, etc.) or crediting the player's account. In some embodiments, the payout may be through an electronic payment system to a user account (e.g., virtual currency account, bank account, casino account, cryptocurrency account, etc.). This example is but one embodiment of the present technology. Those skilled in the art will understand the modifications and variations possible to completing and compensating a player.

In some embodiments of the present technology, the player is compensated an amount of the player's winnings less an administrative fee. This fee may be masked so that the player does not ever see the total player winnings so that the player does not know that the winnings are reduced by the administrative fee. This fee could be given to the operator of the game, the business where the game is located, the licensee of the game, the licensor of the system, or another person. This list is not meant to be exhaustive. Those skilled in the art will understand other persons to whom an administrative fee will be paid.

Multi-Player Skill-Based Tournaments

The present technology also includes systems and methods to conduct Skill-based Tournaments. Referring to FIG. 1, the Tournament Administration module 175 oversees these tournaments. While those skilled in the art will realize many variations and modifications consistent with the present technology, for purposes of description exemplary Skill-based Tournaments are described herein.

A tournament style of play provides players the opportunity to play the games without having to challenge other players to a match and negotiate a fee. Tournament style of play additionally allows for an added dynamic of a "Many vs. Many" environment, which provides many additional options for payouts and Tournament types.

In one exemplary embodiment, players could select tournament play and be presented with a list of available tournaments, such as the following:

| ID | GAME | PLAYERS | BET |
|---|---|---|---|
| 2032 | Pool | 6 out of 9 | $ 0.50 |
| 2390 | Pool | 9 out of 9 | $ 5.00 |
| 2798 | Pool | 1 out of 9 | $ 1.00 |
| 2109 | Car Racing | 8 out of 9 | $ 10.00 |
| 2249 | Car Racing | 2 out of 9 | $100.00 |
| . . . | | | |

From here, a tournament player, such as Player 1, can join any "Table" that is not full of players. For example, Player 1 could pick either "Table" ID 2109 or 2249 in order to play the Car Racing game. In this embodiment, the Car Racing game could be a video type game that looks like a standard car racing video game. In this example, ID 2109 has nine (9) "seats" at an entry fee of $10 per player with eight (8) players already seated and ready to play. Alternatively, if Player 1 wants to play for a higher fee he or she could select ID 2249 at $100 a player.

If Player 1 selects ID 2109, Player 1 will be "seated" for the competition and Player 1's account will be deducted by $10.00. Alternatively, Player 1 could be asked to deposit $10 using the "Cash In" device. Various rules could be used to determine when the precondition for the start of the tournament has been met. In some embodiments, the tournament could begin once nine players are seated. In other embodiments, the tournament could begin at a predetermined time as long at least two (2), or perhaps more, players are seated. Various rules and variations consistent with the present technology could be used. While the collection of funds from a player could be performed at various points in the process, in one or more embodiments, a player can only hold a seat in the tournament with a complete entry fee.

Once funds have been collected from all players and the precondition for beginning the tournament has been met, the players will be allowed to compete in the "Game" of multiplayer Car Racing. For this embodiment, all nine (9) players in the tournament could be actively competing against each other in an interactive Skill-based gaming environment. Upon completion of the Car Racing game, the winning player or players would receive their winnings. The winnings could be determined by various methods. For example, after the house takes a cut of the pot, a set percentage could be paid to the first place winner, second place player, etc. This could be as simple as the house taking 5%, the second place player receiving back his or her stake, and the first place winner receiving the remainder. Those skilled in the art will realize numerous modifications consistent with the present technology.

After the game finishes, all players could be given the opportunity to start a new multiplayer Car Racing game or to select a different game or the same game but under different conditions. In one embodiment, a rematch process could go on continuously as long as there are a minimum of two (2) players at a "Table" and both players have enough money in their account or with them such that they can enter it into the "Cash In" device. The "Table" can be a virtual table where the players are located at a console, video gaming machine, handheld device, cellphone, laptop, or other electronic device. The "Table" may also be a physical device or table in some embodiments.

Numerous tournament types could be implemented on the system in the present technology. In some embodiments, the tournament activity may be recorded in a blockchain system (e.g., blockchain system 190 in FIG. 1) that may be public, private, or a hybrid blockchain system. Exemplary tournaments are described herein.

Delayed Tournaments

In one embodiment, players are offered an opportunity to play in tournaments where players play a skill-based game, but not in a heads up one-on-one fashion, but as a single player trying to get the best score possible.

Delayed tournaments are tournaments in which all participants need to play the game within a validity period. In one embodiment, the tournament could be limited to a fixed number of players. In another embodiment, the tournament could have no limit on the number of players but could require a certain minimum number of players to have played during a defined time period.

Figure 10:
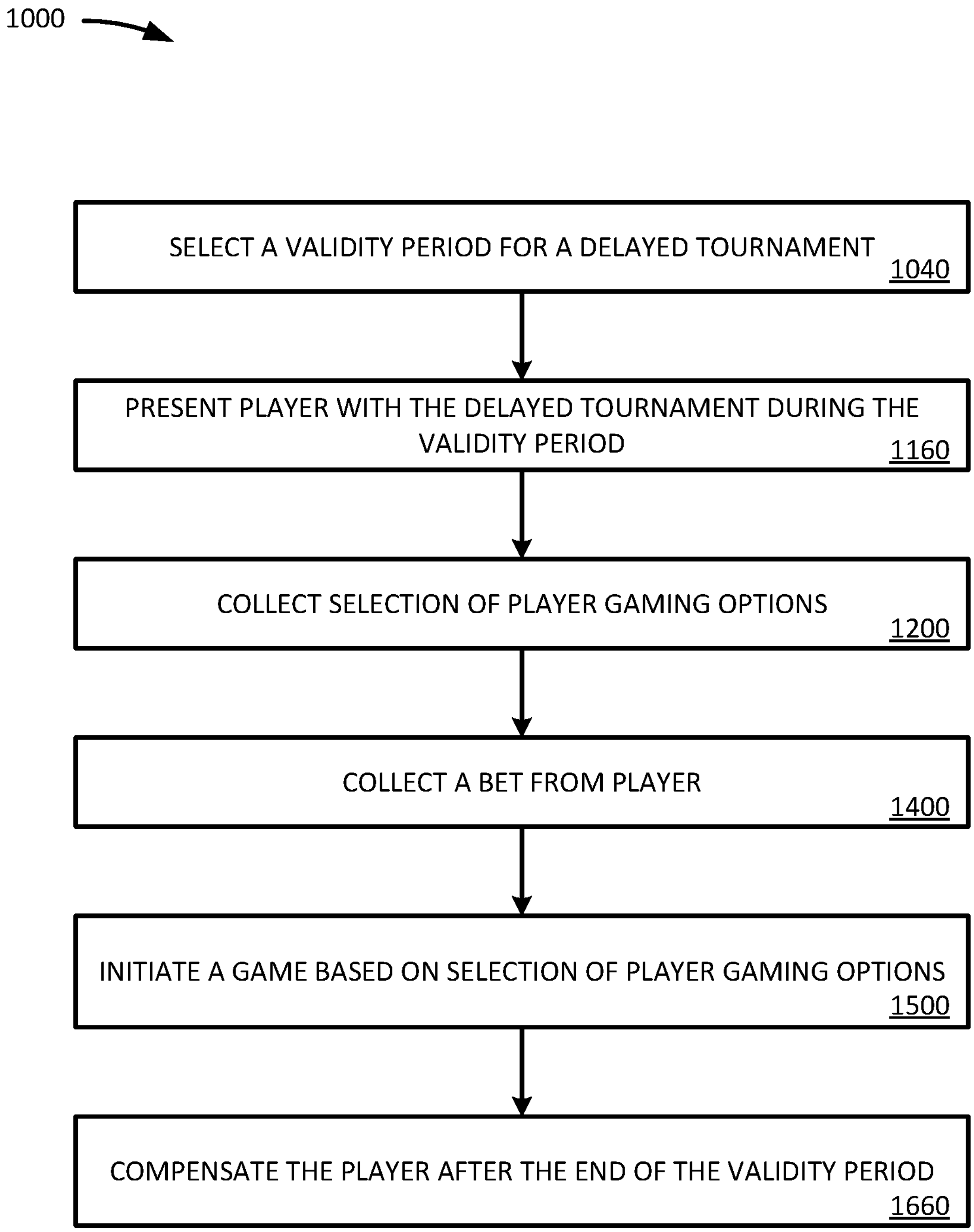
FIG. 10 illustrates one method by which a system could implement a delayed tournament consistent with various embodiments of the present technology.

Referring now to FIG. 10, this figure demonstrates an exemplary method for a delayed tournament. First, a validity period for the delayed tournament is selected 1040. For example, in one embodiment, a Delayed Tournament requires that five (5) players play a game within a 24 hour period from noon of one day to noon of the following day. The tournament requires an entry fee and the game is Pool. Adam, Brian, Chris and David are the first four (4) players to enter the tournament, pay the entry fee and post a score. Each of the four (4) players plays the game in "single player" mode. Each player is presented with the exact same Pool game. The Tournament starts at 1 pm and Adam finishes his game at 1:10 pm, Brian finishes his game at 2:30 pm, Chris at 3:43 pm and David at 2:00 am the next day.

The delayed tournament is not finished yet because this tournament needs five (5) total players. The system presents a player with a set of valid gaming options 1160. So at 9:30 am, the system presents Eric with a Delayed Tournament that needs one more player. Then, the system collects Eric's selection of the tournament 1200, and the system collects his $2 entry fee 1400. The system then initiates a game for Eric 1500. When he finishes the game, the tournament is complete, and the winners account is paid right away 1660.

In one embodiment, if no fifth (5th) player joined the game before the 24 hour time limit had elapsed, then all of the players would be refunded their money. In another embodiment, if no fifth (5th) player joined the game, the tournament would simply close and pay out according to the first four (4) players.

This delayed method of tournament game play allows the ability to provide skill-based game play without the need of readily available players to compete against at a specific time. Additionally, this tournament type allows for a defined and concise structure that allow for a varying selection of game options, end times, participants and a layer of strategy when picking tournaments to play.

Players can sit down at a machine, play their game, post a score and check their account later to see if they won or lost that tournament, all on their own schedule. In addition, in one embodiment, rather than using an account, players could still use the "Cash In" and "Ticket Out" device. For example, if a player does not set up an account they could receive a ticket that identifies the player as a specific participant in the tournament. That ticket can then be used to check the tournament status, and once the tournament is complete the ticket can have a monetary value depending on the outcome.

Jackpot Tournaments

This type of tournament is just a modification of a Delayed Tournament. In a Jackpot Tournament, there is no limit to how many players can play in the tournament, each player adds to the Jackpot, and when the tournament ends, the player with the best score is appointed the winner. Additionally, if there are enough players in a Jackpot tournament, other players could be awarded winnings.

In one embodiment, a player can enter Jackpot Tournaments as many times as he or she wants, paying the entry fee each time. In some embodiments, these types of tournaments many only allow a best score to qualify for winnings. In other embodiments, players would be permitted to collect winnings for multiple scores. Those skilled in the art will appreciate and understand modifications and variations consistent with the present technology.

Client Device

Figure 13:
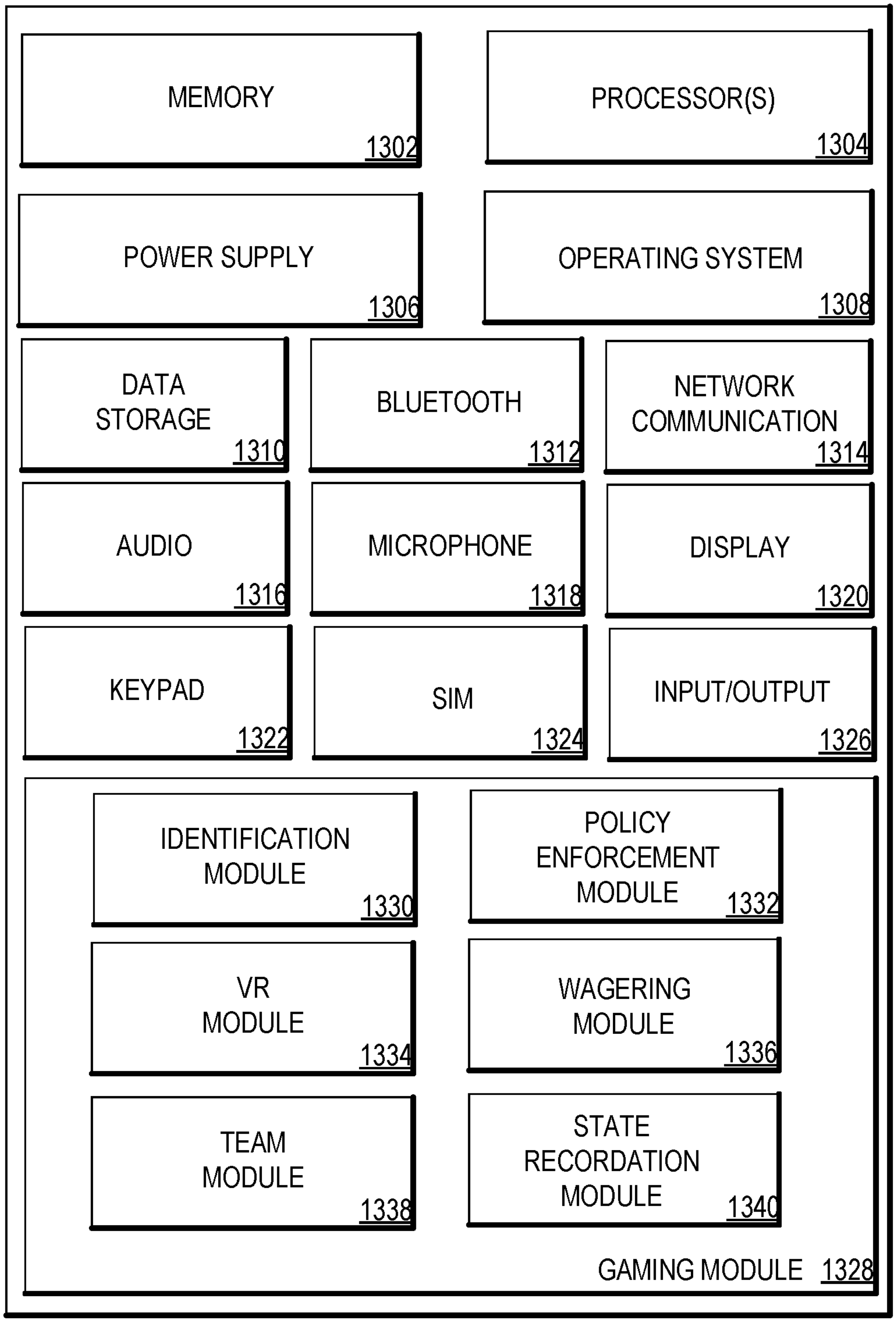
FIG. 13 illustrates an example of various components that may be used within a player terminal in accordance with some embodiments of the present technology.

FIG. 13 illustrates an example of various components that may be used within a client device (e.g., a player terminal such as a gaming cabinet or a mobile device) in accordance with some embodiments of the present technology. As shown in FIG. 13, client device 105 may include memory 1302 (e.g., volatile memory and/or nonvolatile memory), processor(s) 1304, power supply 1306 (e.g., battery), for executing processing instructions, and operating system 1308. Additional components may include data storage component 1310 (e.g., hard drive, flash memory, memory card, etc.), one or more network interfaces (e.g., Bluetooth® Interface 1312; and Network Communication Interface 1314, which enables the player terminal to communicate by transmitting and receiving wireless signals using licensed, semi-licensed or unlicensed spectrums over a telecommunications network), audio interface 1316, microphone 1318, display 1320, keypad or keyboard 1322, SIM card 1324, other input and/or output interfaces 1326, and gaming module 1328. The various components of a mobile device may be interconnected via a bus.

Memory 1302 can be any device, mechanism, or populated data structure used for storing information. In accordance with some embodiments of the present technology, memory 1302 can encompass any type of, but is not limited to, volatile memory, nonvolatile memory and dynamic memory. For example, memory 1302 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 1302 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 1302.

Memory 1302 may be used to store instructions for running one or more applications or modules on processor(s) 1304. For example, memory 1302 could be used in one or more embodiments to house all or some of the instructions needed to execute the functionality of the various system components and/or modules. Processor(s) 1304 are the main processors of player terminal 122 which may include application processors, baseband processors, various coprocessors, and other dedicated processors for operating player terminal 122. For example, an application processor can provide the processing power to support software applications, memory management, graphics processing, and multimedia. An application processor may be communicably coupled with memory 1302 and configured to run the operating system 1308, the user interface, and the applications stored on memory 1302 or data storage component 1310. A baseband processor may be configured to perform signal processing and implement/manage real-time radio transmission operations of a player terminal (e.g., a mobile device). These processors, along with the other components, may be powered by power supply 1306. The volatile and nonvolatile memories found in various embodiments may include storage media for storing information such as processor-readable instructions, data structures, program modules, or other data. Some examples of information that may be stored include basic input/output systems (BIOS), operating systems, and applications.

Operating system 1308 can also provide common services for software applications running on processor(s) 1304. According to the embodiments shown in FIG. 13, gaming module 1328 can include identification module 1330, policy enforcement module 1332, virtual reality (VR) module 1334, wagering module 1336, team module 1338, and state recordation module 1340. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, identification module 1330 and policy enforcement module 1332 can be combined into a single module for identifying and enforcing various policies on a player terminal.

Identification module 1330 can be used to gather information about the player terminal, current and/or past gaming sessions, player information, specific hardware and software configurations of the player terminal, GPS coordinates, associated telephone numbers, IP addresses, e-mail addresses, user identifiers, international mobile station equipment identity (IMEI), mobile equipment identifiers (MEID), integrated circuit card identifiers (ICCID), part identifiers, software identifiers, current gaming session identifiers, identification of any nearby player terminals, and the like. This information can be used in a variety of ways, including by policy enforcement module 1332 which can set customized gaming restriction policies that can, in some embodiments, be dynamically set (e.g., based on location, current gaming session, etc.).

VR module 1334 can be used to allow a variety of virtual reality experiences as part of the game play. Wagering module 1336 can be used to can be used to accept, track and process bets placed by the players. Team module 1338 can be used to track and communicate with players that have organized into teams for competition purposes.

State recordation module 1340 can be used to capture the state of the gaming session. This can include a variety of game states including, but not limited to, wager, payout levels, skill level settings, and others. The state of the gaming session can be repeatedly captured so that in the event of a communication failure, terminal fault, or other issue that would prevent the gaming session from being completed a record of the current state can be reconstructed. For example, in some embodiments, the state may be captured at least every second. In other embodiments, the state may be captured more or less quickly depending on game dynamics. The state captured by state recordation module 1340 may also be used (possibly with state information from other player terminals of the same gaming session) by a collusion avoidance module to determine if any collusion is occurring. In some embodiments, the state information captured by state recordation module 1340 can be used to generate various gaming analytics. In some embodiments, the host computer (or gaming platform) may capture the snapshots of the state information directly.

State recordation module 1340 may store the state information in database for regulatory compliance, analytics, or other purpose. For example, in some embodiments, all the game play within a period of time (e.g., a five year period, a two year period, a year, a month, a week, a day, etc.) could be recorded and stored in the database. In other embodiments, a limited number of gaming sessions could be recorded (e.g., last one hundred, last thirty, etc.). Still yet, some embodiments of state recordation module 1340 may only record (or record for longer period of time) games that have betting above a set threshold (e.g., $500, $1000, etc.).

The state information recorded by state recordation module may be a direct copy of the game play or only information sufficient to reproduce the game play. For example, in some embodiments, the state information may include various gaming parameters (e.g., ammo amounts, number of lives, level, etc.), gaming session identifier, date and time the interactive gaming session is opened or terminated, the date and time the interactive gaming session is logged in to or is logged out of by various player terminals, the physical location, by state or foreign jurisdiction, of the authorized player while logged in to the interactive gaming account, and/or other types of information.

In some embodiments, the player terminals can provide for social media, chatting and other communication channels. For example, some embodiments, may have interfaces that allow for third party access through another gateway like Facebook® or other social media. Some embodiments of the player terminals may allow for picture in picture or multiple screens. For example, players may be able to play an interactive game via one screen or video channel and in the second screen or video channel being displayed in the picture in picture (PIP) thereby allowing players to play more than one at a time. The additional screens or video channel, for example, could be used to watch sports, fantasy sports betting, ordering drinks or food, and the like. In some embodiments, additional screens may be present to present various promotions such as ticket sells for shows, restaurant deals, future room bookings, room upgrades, and the like.

Some embodiments of the player terminals may also include external video outputs that allow for display of the game by others. For example, in various tournament play (e.g., eSports), the external video outputs may allow others to watch the game play. In various embodiments, the player terminals may support virtual reality interfaces, hologram generation systems, and other visualizations system for the gaming. The player terminals, in some embodiments, can include various sensors to detect gestures that can be interpreted as controls for betting, controlling gaming action, ordering drinks, etc. In addition, some player terminals may have voice recognition software which can be used as a technique to identify player locations. Some embodiments may also be able to mimic voices of different people (e.g., famous people, friends, etc.) that can be used as the computer voice while the player is playing or interacting with a player terminal.

Exemplary Computer System Overview

Aspects and implementations of the interactive gaming system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, cloud-based gaming platform or other computing device) programmed with the instructions to perform the steps or operations. For example, the steps or operations may be performed by a combination of hardware, software, and/or firmware.

Figure 14:
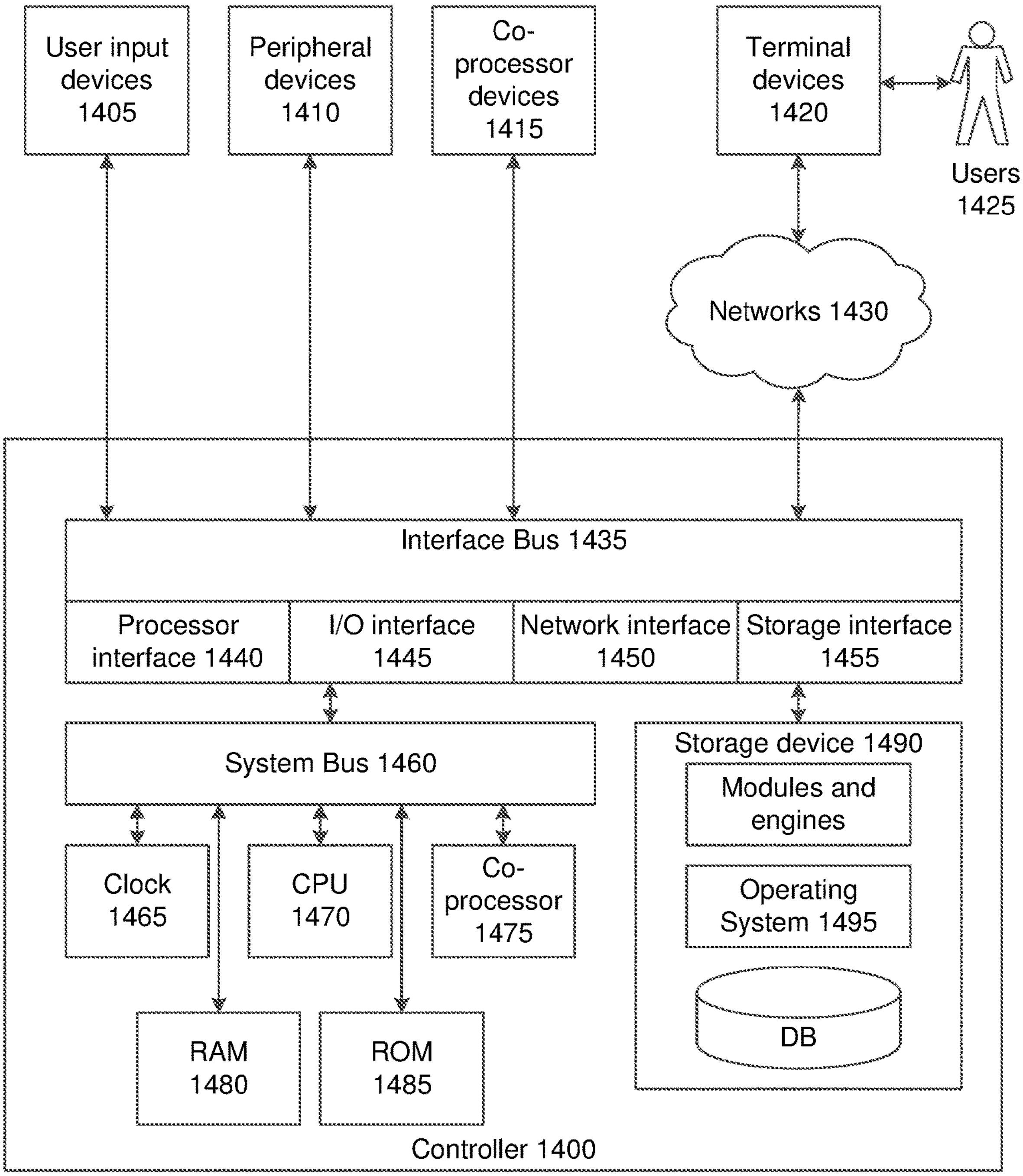
FIG. 14 is an example of a computer systemization of various embodiments of the present technology.

FIG. 14 is a block diagram illustrating an example machine representing the computer systemization of the gaming system. The gaming controller 1400 may be in communication with entities including one or more users 1425 client/terminal devices 1420 (e.g., devices 122), user input devices 1405, peripheral devices 1410, optional co-processor device(s) (e.g., cryptographic processor devices) 1415, and networks 1430 (e.g., 110 and 120 in FIG. 1). Users may engage with the gaming controller 1400 via terminal devices 1420 over networks 1430. In some embodiments, all or a portion of the communications between terminal devices 1420 and gaming controller 1400 can be encrypted. The law requires cryptography for some things.

Computers may employ central processing units (CPUs) or processors to process information. Processors may include programmable general-purpose or special-purpose microprocessors, programmable controllers, application-specific integrated circuits (ASICs), programmable logic devices (PLDs), embedded components, a combination of such devices and the like. Processors execute program components in response to user and/or system-generated requests. One or more of these components may be implemented in software, hardware or both hardware and software. Processors pass instructions (e.g., operational and data instructions) to enable various operations.

The gaming controller 1400 may include clock 1465, CPU 1470, memory such as read only memory (ROM) 1485 and random access memory (RAM) 1480 and co-processor 1475 among others. These controller components may be connected to a system bus 1460, and through the system bus 1460 to an interface bus 1435. Further, user input devices 1405, peripheral devices 1410, co-processor devices 1415, and the like, may be connected through the interface bus 1435 to the system bus 1460. The interface bus 1435 may be connected to a number of interface adapters such as processor interface 1440, input output interfaces (I/O) 1445, network interfaces 1450, storage interfaces 1455, and the like.

Processor interface 1440 may facilitate communication between co-processor devices 1415 and co-processor 1475. In one implementation, processor interface 1440 may expedite encryption and decryption of requests or data. Input output interfaces (I/O) 1445 facilitate communication between user input devices 1405, peripheral devices 1410, co-processor devices 1415, and/or the like and components of gaming controller 1400 using protocols such as those for handling audio, data, video interface, wireless transceivers, or the like (e.g., Bluetooth®, IEEE 1494a-b, serial, universal serial bus (USB), Digital Visual Interface (DVI), 802.11 a/b/g/n/x, cellular, etc.). Network interfaces 1450 may be in communication with the network 1430. Through the network 1430, gaming controller 1400 may be accessible to remote terminal devices 1420 (e.g., gaming client 105 illustrated in FIG. 1). Network interfaces 1450 may use various wired and wireless connection protocols such as, direct connect, Ethernet, wireless connection such as IEEE 802.11a-x, miracast and the like. Some components of the interactive gaming system may include various protocols or comply with various standards or certifications set forth by different associations or regulatory agencies. For example, some embodiments may use the slot accounting system (SAS) protocol or comply with the game to system (G2S) standard.

Examples of network 1430 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1450 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1455 may be in communication with a number of storage devices such as, storage devices 1490, removable disc devices, and the like. The storage interfaces 1455 may use various connection protocols such as Serial Advanced Technology Attachment (SATA), IEEE 1494, Ethernet, Fiber, Universal Serial Bus (USB), and the like.

User input devices 1405 and peripheral devices 1410 may be connected to I/O interface 1445 and potentially other interfaces, buses and/or components. User input devices 1405 may include card readers, finger print readers, joysticks, keyboards, microphones, mouse, remote controls, retina readers, touch screens, sensors, and/or the like. Peripheral devices 1410 may include antenna, audio devices (e.g., microphone, speakers, etc.), cameras, external processors, communication devices, radio frequency identifiers (RFIDs), scanners, printers, storage devices, transceivers, and/or the like. Co-processor devices 1415 may be connected to the controller 1400 through interface bus 1435, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1400 may employ various forms of memory including on-chip CPU memory (e.g., registers), RAM 1480, ROM 1485, and storage devices 1490. Storage devices 1490 may employ any number of tangible, non-transitory storage devices or systems such as fixed or removable magnetic disk drive, an optical drive, solid state memory devices and other processor-readable storage media. Computer-executable instructions stored in the memory may include an interactive gaming platform having one or more program modules such as routines, programs, objects, components, data structures, and so on that perform particular tasks or implement particular abstract data types. For example, the memory may contain operating system (OS) component 1495, modules and other components, database tables, and the like. These modules/components may be stored and accessed from the storage devices, including from external storage devices accessible through an interface bus 1435.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The gaming controller 1400 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the gaming controller 1400 may be distributed electronically over the Internet or over other networks (including wireless networks). Those skilled in the relevant art(s) will recognize that portions of the interactive gaming system may reside on a server computer, while corresponding portions reside on a client computer. Data structures and transmission of data particular to aspects of the gaming controller 1400 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

Having described several embodiments, it will be recognized by those of skill in the art that various modifications, alternative constructions, and equivalents may be used without departing from the spirit of the technology. Additionally, a number of well-known processes and elements have not been described in order to avoid unnecessarily obscuring the present technology. Accordingly, the above description should not be taken as limiting the scope of the technology, which is defined in the following claims.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system for hosting one or more electronic games, the system comprising:
- a communications interface; and
- one or more processors operatively coupled to the communications interface, and configured to:
  - receive, via the communications interface, a selection by a player of an electronic game;
  - enable the electronic game to be played using a computing device operable by the player;
  - determine a game result based on game play by the player in the electronic game;
  - cause value to be awarded to the player in a cryptocurrency in accordance with the game result;
  - generate metadata representing a game state and outcome;
  - generate a cryptographic hash of the metadata;
  - transmit the hash to a blockchain node for consensus-based inclusion in an immutable ledger; and
  - invoke a smart contract deployed on the blockchain, wherein the smart contract is configured to conditionally release a tokenized reward based on validation of the hash corresponding to the game result;
- wherein the one or more processors are further configured to direct the communications interface to establish a connection with a blockchain to facilitate the value being caused to be awarded to the player in the cryptocurrency.

2. The system of claim 1, wherein the one or more processors are further configured to direct the communications interface to establish the connection with the blockchain to facilitate recordation of the game result in the immutable ledger.

3. The system of claim 1, wherein the one or more processors are further configured to collect, via the communications interface, game play data for the electronic game.

4. The system of claim 3, wherein to collect the game play data for the electronic game, the one or more processors are further configured to collect the game play data while the electronic game is running or upon completion of the electronic game.

5. The system of claim 4, wherein to determine the game result, the one or more processors are further configured to determine the game result further based on the collected game play data.

6. The system of claim 3, wherein the one or more processors are further configured to direct the communications interface to establish the connection with the blockchain to facilitate recordation of the game play data in the immutable ledger.

7. The system of claim 1, wherein to cause value to be awarded to the player, the one or more processors are further configured to cause the value to be transferred or credited to an account associated with the player.

8. The system of claim 7, wherein the one or more processors are further configured to receive, via the communications interface, identifying information about the account associated with the player.

9. The system of claim 1, wherein the one or more processors are further configured to receive, via the communications interface, identifying information about at least one of the player, the computing device operable by the player, and an account associated with the player.

10. The system of claim 1, wherein to cause value to be awarded to the player, the one or more processors are further configured to cause the value to be awarded to the player after completion of the electronic game.

11. A method in a system for hosting one or more electronic games, the method comprising:
- receiving a selection by a player of an electronic game;
- enabling the electronic game to be played using a computing device operable by the player;
- determining a game result based on game play by the player in the selected electronic game;
- generating metadata representing a game state and outcome;
- generating a cryptographic hash of the metadata;
- transmitting the hash to a blockchain node for consensus-based inclusion in an immutable ledger;
- invoking a smart contract deployed on the blockchain, the smart contract being configured to conditionally release a cryptocurrency value based on the validated hash corresponding to the game result; and causing value to be awarded to the player in a cryptocurrency in accordance with the game result, wherein the method further comprises establishing a connection with a blockchain to facilitate causing the value to be awarded to the player in the cryptocurrency.

12. The method of claim 11, wherein receiving the selection of the electronic game comprises receiving the same selection of the electronic game from the player and from at least one other player.

13. The method of claim 12, wherein enabling the electronic game to be played comprises enabling the electronic game to be played using the computing device operable by the player and at least one additional computing device operable by the at least one other player.

14. The method of claim 13, wherein determining the game result comprises computing the game result based on game play by the player and the at least one other player in the selected electronic game.

15. The method of claim 14, wherein causing value to be awarded to the player comprises causing value to be awarded to at least one of the player and the at least one other player in accordance with the computed game result.

16. The method of claim 11, wherein causing the value to be awarded to the player comprises converting the value from one form to another form.

17. The method of claim 11, wherein causing the value to be awarded to the player comprises deducting from the value a fee due to an entity facilitating play of the electronic game.

18. The method of claim 11 further comprising enabling a balance of an account associated with the player to be viewed or accessed via the computing device operable by the player.

19. One or more non-transitory computer readable media having program instructions stored thereon which, when executed by one or more processors of a machine, cause the machine to:

receive, via a communications interface, a selection by a player of an electronic game;

enable the electronic game to be played using a computing device operable by the player;

determine a game result based on game play by the player in the selected electronic game;

generate metadata representing a game state and outcome;

generate a cryptographic hash of the metadata;

transmit the hash to a blockchain node for consensus-based inclusion in an immutable ledger;

invoke a smart contract deployed on the blockchain, the smart contract being configured to conditionally release a cryptocurrency value based on the validated hash corresponding to the game result; and cause value to be awarded to the player in a cryptocurrency in accordance with the game result, wherein, when executed by the one or more processors, the program instructions further cause the machine to establish a connection with a blockchain to facilitate the value being caused to be awarded to the player in the cryptocurrency.

20. A system for hosting one or more electronic games, the system comprising:

a communications interface; and one or more processors operatively coupled to the communications interface, and configured to:

receive, via the communications interface, a selection by a player of an electronic game;

enable the electronic game to be played using a computing device operable by the player;

determine a game result based on game play by the player in the electronic game;

generate metadata representing a game state and outcome;

generate a cryptographic hash of the metadata;

transmit the hash to a blockchain node for consensus-based inclusion in an immutable ledger;

invoke a smart contract deployed on the blockchain, the smart contract being configured to conditionally release a cryptocurrency value based on the validated hash corresponding to the game result; and cause value to be awarded to the player in a virtual currency in accordance with the game result, wherein the one or more processors are further configured to direct the communications interface to establish a connection with a blockchain to facilitate the value being caused to be awarded to the player in the virtual currency.

21. The system of claim 20, wherein the one or more processors are further configured to direct the communications interface to establish the connection with the blockchain to further facilitate recordation of the game result in the immutable ledger.

22. The system of claim 20, wherein the one or more processors are further configured to collect, via the communications interface, game play data for the electronic game while the electronic game is running or upon completion of the electronic game.

23. The system of claim 22, wherein the one or more processors are further configured to direct the communications interface to establish the connection with the blockchain to further facilitate recordation of the game play data in the immutable ledger.

24. The system of claim 22, wherein to determine the game result, the one or more processors are further configured to determine the game result further based on the collected game play data.

25. The system of claim 20, wherein to cause value to be awarded to the player, the one or more processors are further configured to cause the value to be awarded to the player after completion of the electronic game.

26. The system of claim 20, wherein to cause value to be awarded to the player, the one or more processors are further configured to cause the value to be transferred or credited to an account associated with the player.

27. The system of claim 26, wherein the one or more processors are further configured to receive, via the communications interface, identifying information about the account associated with the player.

28. The system of claim 20, wherein the one or more processors are further configured to receive, via the communications interface, identifying information about at least one of the player, the computing device operable by the player, and an account associated with the player.

29. The system of claim 20, wherein to cause value to be awarded to the player, the one or more processors are further configured to convert the value from one form to another form.

30. The system of claim 20, wherein the one or more processors are further configured to deduct from the value a fee due to an entity facilitating play of the electronic game.

31. A method in a system for hosting one or more electronic games, the method comprising:

receiving a selection by a player of an electronic game;

enabling the electronic game to be played using a computing device operable by the player;

determining a game result based on game play by the player in the selected electronic game;

generating metadata representing a game state and outcome;

generating a cryptographic hash of the metadata;

transmitting the hash to a blockchain node for consensus-based inclusion in an immutable ledger;

invoking a smart contract deployed on the blockchain, the smart contract being configured to conditionally release a virtual currency value based on the validated hash corresponding to the game result; and causing value to be awarded to the player in a virtual currency in accordance with the game result, wherein the method further comprises establishing a connection with a blockchain to facilitate causing the value to be awarded to the player in the virtual currency.

32. The method of claim 31, wherein the establishing comprises establishing the connection with the blockchain to further facilitate recordation of the game result in the immutable ledger.

33. The method of claim 31 further comprising collecting game play data for the electronic game while the electronic game is running or upon completion of the electronic game.

34. The method of claim 33, wherein the establishing comprises establishing the connection with the blockchain to further facilitate recordation of the game play data in the immutable ledger.

35. The method of claim 33, wherein determining the game result comprises determining the game result further based on the collected game play data.

36. The method of claim 34, wherein causing the value to be awarded to the player comprises causing the value to be awarded to the player after completion of the electronic game.

37. The method of claim 31, wherein causing the value to be awarded to the player comprises causing the value to be transferred or credited to an account associated with the player.

38. The method of claim 37 further comprising receiving identifying information about the account associated with the player.

39. The method of claim 31, wherein causing the value to be awarded to the player comprises converting the value from one form to another form.

40. The method of claim 31 further comprising deducting from the value a fee due to an entity facilitating play of the electronic game.

41. One or more non-transitory computer readable media having program instructions stored thereon which, when executed by one or more processors of a machine, cause the machine to:

receive a selection by a player of an electronic game;

enable the electronic game to be played using a computing device operable by the player;

determine a game result based on game play by the player in the selected electronic game;

generate metadata representing a game state and outcome;

generate a cryptographic hash of the metadata;

transmit the hash to a blockchain node for consensus-based inclusion in an immutable ledger;

invoke a smart contract deployed on the blockchain, the smart contract being configured to conditionally release a virtual currency value based on the validated hash corresponding to the game result; and cause value to be awarded to the player in a virtual currency in accordance with the game result, wherein, when executed by the one or more processors, the program instructions further cause the machine to establish a connection with a blockchain to facilitate the value being caused to be awarded to the player in the virtual currency.

42. A system for hosting one or more electronic games, the system comprising:

a communications interface; and one or more processors operatively coupled to the communications interface, and configured to:

receive, via the communications interface, a selection by a player of an electronic game;

enable the electronic game to be played using a computing device operable by the player;

determine a game result based on game play by the player in the electronic game;

generate metadata representing the game result and item state;

generate a cryptographic hash of the metadata;

transmit the hash to a blockchain node for consensus-based inclusion in an immutable ledger;

invoke a smart contract configured to mint or modify at least one NFT corresponding to the validated hash; and cause value to be awarded to the player in at least one non-fungible token (NFT) in accordance with the game result, wherein the one or more processors are further configured to direct the communications interface to establish a connection with a blockchain to facilitate creation, use, destruction, transformation, merger, or combination of the at least one NFT.

43. The system of claim 42, wherein the one or more processors are further configured to enable a marketplace exchange to be viewed or accessed via the computing device operable by the player to further facilitate transfer of the at least one NFT to a separate system.

44. The system of claim 42, wherein the at least one NFT is created within the blockchain, and wherein the one or more processors are configured to receive, via the communications interface, a signal from the computing device encoding data representative of a request to change ownership of the at least one NFT in the blockchain.

45. The system of claim 42, wherein the one or more processors are further configured to direct the communications interface to establish the connection with the blockchain to further facilitate recordation of the game result in the immutable ledger.

46. The system of claim 42, wherein the one or more processors are further configured to collect, via the communications interface, game play data for the electronic game while the electronic game is running or upon completion of the electronic game.

47. The system of claim 46, wherein the one or more processors are further configured to direct the communications interface to establish the connection with the blockchain to further facilitate recordation of the game play data in the immutable ledger.

48. The system of claim 46, wherein to determine the game result, the one or more processors are further configured to determine the game result further based on the collected game play data.

49. The system of claim 42, wherein to cause value to be awarded to the player, the one or more processors are further configured to cause the value to be awarded to the player after completion of the electronic game.

50. The system of claim 42, wherein to cause value to be awarded to the player, the one or more processors are further configured to cause the value to be transferred or credited to an account associated with the player.

51. The system of claim 50, wherein the one or more processors are further configured to receive, via the communications interface, identifying information about the account associated with the player.

52. The system of claim 42, wherein to cause value to be awarded to the player, the one or more processors are further configured to convert the value from one form to another form.

53. The system of claim 42, wherein the one or more processors are further configured to deduct from the value a fee due to an entity facilitating play of the electronic game.

54. A method in a system for hosting one or more electronic games, the method comprising:

receiving a selection by a player of an electronic game;

enabling the electronic game to be played using a computing device operable by the player;

determining a game result based on game play by the player in the selected electronic game;

generating metadata representing the game result and NFT configuration;

generating a cryptographic hash of the metadata;

transmitting the hash to a blockchain node for consensus-based inclusion in an immutable ledger;

invoking a smart contract deployed on the blockchain, the smart contract being configured to mint or modify at least one NFT corresponding to the validated hash; and causing value to be awarded to the player in at least one non-fungible token (NFT) in accordance with the game result, wherein the method further comprises establishing a connection with a blockchain to facilitate causing the value to be awarded to the player in the at least one NFT.

55. The method of claim 54 further comprising enabling a marketplace exchange to be viewed or accessed via the computing device operable by the player to further facilitate transfer of the at least one NFT to a separate system.

56. The method of claim 54, wherein the at least one NFT is created within the blockchain, the method further comprising receiving a signal from the computing device encoding data representative of a request to change ownership of the at least one NFT in the blockchain.

57. The method of claim 54, wherein the establishing comprises establishing the connection with the blockchain to further facilitate recordation of the game result in the immutable ledger.

58. The method of claim 54 further comprising collecting game play data for the electronic game while the electronic game is running or upon completion of the electronic game.

59. The method of claim 58, wherein the establishing comprises establishing the connection with the blockchain to further facilitate recordation of the game play data in the immutable ledger.

60. The method of claim 58, wherein the determining comprises determining the game result further based on the collected game play data.

61. The method of claim 5, wherein the causing comprises causing the value to be awarded to the player after completion of the electronic game.

62. The method of claim 54, wherein the causing comprises causing the value to be transferred or credited to an account associated with the player.

63. The method of claim 62 further comprising receiving identifying information about the account associated with the player.

64. The method of claim 54, wherein the causing comprises converting the value from one form to another form.

65. The method of claim 54 further comprising deducting from the value a fee due to an entity facilitating play of the electronic game.

66. A system for hosting one or more electronic games, the system comprising:

a communications interface; and one or more processors operatively coupled to the communications interface, and configured to:

receive, via the communications interface, a selection by a player of an electronic game;

enable the electronic game to be played using a computing device operable by the player;

determine a game result based on game play by the player in the electronic game;

generate metadata representing the game result;

generate a cryptographic hash of the metadata;

transmit the hash to a blockchain node for consensus-based inclusion in an immutable ledger; and cause value to be awarded to the player in accordance with the game result, wherein the one or more processors are further configured to direct the communications interface to establish a connection with a blockchain to facilitate recordation of the game result in the immutable ledger.

67. The system of claim 66, wherein the one or more processors are further configured to collect, via the communications interface, game play data for the electronic game while the electronic game is running or upon completion of the electronic game.

68. The system of claim 67, wherein the one or more processors are further configured to direct the communications interface to establish the connection with the blockchain to further facilitate recordation of the game play data in the immutable ledger.

69. The system of claim 67, wherein to determine the game result, the one or more processors are further configured to determine the game result further based on the collected game play data.

70. The system of claim 66, wherein to cause value to be awarded to the player, the one or more processors are further configured to cause the value to be awarded to the player after completion of the electronic game.

71. The system of claim 66, wherein to cause value to be awarded to the player, the one or more processors are further configured to cause the value to be awarded to the player in a cryptocurrency, a virtual currency, at least one NFT, or one or more virtual goods or items.

72. The system of claim 71, wherein the one or more processors are further configured to direct the communications interface to establish the connection with the blockchain to further facilitate the value being caused to be awarded to the player in the cryptocurrency, the virtual currency, the at least one NFT, or the one or more virtual goods or items.

73. The system of claim 66, wherein to cause value to be awarded to the player, the one or more processors are further configured to cause the value to be transferred or credited to an account associated with the player.

74. The system of claim 73, wherein the one or more processors are further configured to receive, via the communications interface, identifying information about the account associated with the player.

75. The system of claim 66, wherein to cause value to be awarded to the player, the one or more processors are further configured to convert the value from one form to another form.

76. The system of claim 66, wherein the one or more processors are further configured to deduct from the value a fee due to an entity facilitating play of the electronic game.

77. A method in a system for hosting one or more electronic games, the method comprising:

receiving a selection by a player of an electronic game;
enabling the electronic game to be played using a computing device operable by the player;
determining a game result based on game play by the player in the electronic game;
generating metadata representing the game result;
generating a cryptographic hash of the metadata;
transmitting the hash to a blockchain node for consensus-based inclusion in an immutable ledger; and
causing value to be awarded to the player in accordance with the game result,
wherein the method further comprises establishing a connection with a blockchain to facilitate recordation of the game result in the immutable ledger.

78. The method of claim 77 further comprising collecting game play data for the electronic game while the electronic game is running or upon completion of the electronic game.

79. The method of claim 78, wherein the establishing comprises establishing the connection with the blockchain to further facilitate recordation of the game play data in the immutable ledger.

80. The method of claim 78, wherein the determining comprises determining the game result further based on the collected game play data.

81. The method of claim 77, wherein the causing comprises causing the value to be awarded to the player after completion of the electronic game.

82. The method of claim 77, wherein the causing comprises causing the value to be awarded to the player in a cryptocurrency, a virtual currency, at least non-fungible token (NFT), or one more virtual goods or items.

83. The method of claim 82, wherein the establishing comprises establishing the connection with the blockchain to further facilitate the value being caused to be awarded to the player in the cryptocurrency, the virtual currency, the at least one NFT, or the one or more virtual goods or items.

84. The method of claim 77, wherein the causing comprises causing the value to be transferred or credited to an account associated with the player.

85. The method of claim 84 further comprising receiving identifying information about the account associated with the player.

86. The method of claim 77, wherein the causing comprises converting the value from one form to another form.

87. The method of claim 77 further comprising deducting from the value a fee to an entity facilitating play of the electronic game.

88. One or more non-transitory computer readable media having program instructions stored thereon which, when executed by one or more processors of a machine, cause the machine to:

receive a selection by a player of an electronic game;
enable the electronic game to be played using a computing device operable by the player;
determine a game result based on game play by the player in the electronic game;
generate metadata representing the game result;
generate a cryptographic hash of the metadata;
transmit the hash to a blockchain node for consensus-based inclusion in an immutable ledger; and
cause value to be awarded to the player in accordance with the game result,
wherein, when executed by the one or more processors, the program instructions further cause the machine to establish a connection with a blockchain to facilitate recordation of the game result in the immutable ledger.

89. A system for hosting one or more electronic games, the system comprising:

a communications interface; and
one or more processors operatively coupled to the communications interface, and configured to:
receive, via the communications interface, a selection by a player of an electronic game;
enable the electronic game to be played using a computing device operable by the player;
determine a game result based on game play by the player in the electronic game;
cause value to be awarded to the player in accordance with the game result;
collect, via the communications interface, game play data for the electronic game;
generate a cryptographic hash of the game play data;
transmit the hash to a blockchain node for consensus-based inclusion in an immutable ledger; and
wherein the one or more processors are further configured to direct the communications interface to establish a connection with a blockchain to facilitate recordation of the game play data in the immutable ledger.

90. The system of claim 89, wherein the one or more processors are further configured to direct the communications interface to establish the connection with the blockchain to further facilitate recordation of the game result in the immutable ledger.

91. The system of claim 89, wherein to determine the game result, the one or more processors are further configured to determine the game result further based on the collected game play data.

92. The system of claim 89, wherein to cause value to be awarded to the player, the one or more processors are further configured to cause the value to be awarded to the player after completion of the electronic game.

93. The system of claim 89, wherein to cause value to be awarded to the player, the one or more processors are further configured to cause the value to be awarded to the player in a cryptocurrency, a virtual currency, at least one non-fungible token (NFT), or one or more virtual goods or items.

94. The system of claim 93, wherein the one or more processors are further configured to direct the communications interface to establish the connection with the blockchain to further facilitate the value being caused to be awarded to the player in the cryptocurrency, the virtual currency, the at least one NFT, or the one or more virtual goods or items.

95. The system of claim 89, wherein to cause value to be awarded to the player, the one or more processors are further configured to cause the value to be transferred or credited to an account associated with the player.

96. The system of claim 95, wherein the one or more processors are further configured to receive, via the communications interface, identifying information about the account associated with the player.

97. The system of claim 89, wherein to cause the value to be awarded to the player, the one or more processors are further configured to convert the value from one form to another form.

98. The system of claim 89, wherein the one or more processors are further configured to deduct from the value a fee due to an entity facilitating play of the electronic game.

99. A method in a system for hosting one or more electronic games, the method comprising:

receiving a selection by a player of an electronic game;

enabling the electronic game to be played using a computing device operable by the player;

determining a game result based on game play by the player in the electronic game;

causing value to be awarded to the player in accordance with the game result;

collecting game play data for the electronic game;

generating a cryptographic hash of the game play data;

transmitting the hash to a blockchain node for consensus-based inclusion in an immutable ledger; and wherein the method further comprises establishing a connection with a blockchain to facilitate recordation of the game play data in the immutable ledger.

100. The method of claim 99, wherein the establishing comprises establishing the connection with the blockchain to further facilitate recordation of the game result in the immutable ledger.

101. The method of claim 99, wherein the determining comprises determining the game result further based on the collected game play data.

102. The method of claim 99, wherein the causing comprises causing the value to be awarded to the player after completion of the electronic game.

103. The method of claim 99, wherein the causing comprises causing the value to be awarded to the player in a cryptocurrency, a virtual currency, at least one non-fungible token (NFT), or one or more virtual goods or items.

104. The method of claim 103, wherein the establishing comprises establishing the connection with the blockchain to further facilitate the value being caused to be awarded to the player in the cryptocurrency, the virtual currency, the at least one NFT, or the one or more virtual goods or items.

105. One or more non-transitory computer readable media having program instructions stored thereon which, when executed by one or more processors of a machine, cause the machine to:

receive a selection by a player of an electronic game;

enable the electronic game to be played using a computing device operable by the player;

determine a game result based on game play by the player in the electronic game;

cause value to be awarded to the player in accordance with the game result;

collect game play data for the electronic game;

generate a cryptographic hash of the game play data;

transmit the hash to a blockchain node for consensus-based inclusion in an immutable ledger; and wherein, when executed by the one or more processors, the program instructions further cause the machine to establish a connection with a blockchain to facilitate recordation of the game play data in the immutable ledger.

106. A system for hosting one or more electronic games, the system comprising:

a communications interface; and one or more processors operatively coupled to the communications interface, and configured to:

receive, via the communications interface, a selection by a player of an electronic game;

enable the electronic game to be played using a computing device operable by the player;

determine a game result based on game play by the player in the electronic game;

generate metadata representing virtual goods or items awarded;

generate a cryptographic hash of the metadata;

transmit the hash to a blockchain node for consensus-based inclusion in an immutable ledger; and cause value to be awarded to the player in one or more virtual goods or items in accordance with the game result, wherein the one or more processors are further configured to direct the communications interface to establish a connection with a blockchain to facilitate creation, use, destruction, transformation, merger, or combination of the one or more virtual goods or items.

107. The system of claim 106, wherein the one or more processors are further configured to enable a marketplace exchange to be viewed or accessed via the computing device operable by the player to further facilitate transfer of the one or more virtual goods or items to a separate system.

108. The system of claim 106, wherein the one or more virtual goods or items are created within the blockchain, and wherein the one or more processors are configured to receive, via the communications interface, a signal from the computing device encoding data representative of a request to change ownership of the one or more virtual goods or items in the blockchain.

109. The system of claim 106, wherein the one or more virtual goods or items include at least one non-fungible token (NFT).

110. The system of claim 106, wherein the one or more virtual goods or items include at least one game item.

111. The system of claim 110, wherein the at least one game item includes at least one of a skin, a crate, a token, a container, an NFT, a bin, an emoji, a character, a prize, a card, and a weapon.

112. The system of claim 106, wherein the one or more processors are further configured to direct the communications interface to establish the connection with the blockchain to further facilitate recordation of the game result in the immutable ledger.

113. The system of claim 106, wherein the one or more processors are further configured to collect, via the communications interface, game play data for the electronic game while the electronic game is running or upon completion of the electronic game.

114. The system of claim 113, wherein the one or more processors are further configured to direct the communications interface to establish the connection with the blockchain to further facilitate recordation of the game play data in the immutable ledger.

115. The system of claim 113, wherein to determine the game result, the one or more processors are further configured to determine the game result further based on the collected game play data.

116. The system of claim 106, wherein to cause value to be awarded to the player, the one or more processors are further configured to cause the value to be awarded to the player after completion of the electronic game.

117. The system of claim 106, wherein to cause value to be awarded to the player, the one or more processors are further configured to cause the value to be transferred or credited to an account associated with the player.

118. The system of claim 117, wherein the one or more processors are further configured to receive, via the communications interface, identifying information about the account associated with the player.

119. The system of claim 106, wherein to cause the value to be awarded to the player, the one or more processors are further configured to convert the value from one form to another form.

120. The system of claim 106, wherein the one or more processors are further configured to deduct from the value a fee due to an entity facilitating play of the electronic game.

121. A method in a system for hosting one or more electronic games, the method comprising:

receiving a selection by a player of an electronic game;

enabling the electronic game to be played using a computing device operable by the player;

determining a game result based on game play by the player in the selected electronic game;

causing value to be awarded to the player in one or more virtual goods or items in accordance with the game result;

generating metadata representing the virtual goods or items awarded;

generating a cryptographic hash of the metadata;

transmitting the hash to a blockchain node for consensus-based inclusion in an immutable ledger; and wherein the method further comprises establishing a connection with a blockchain to facilitate creation, use, destruction, transformation, merger, or combination of the one or more virtual goods or items.

122. The method of claim 121 further comprising enabling a marketplace exchange to be viewed or accessed via the computing device operable by the player to further facilitate transfer of the one or more virtual goods or items to a separate system.

123. The method of claim 121, wherein the one or more virtual goods or items are created within the blockchain, and wherein the method further comprises receiving a signal from the computing device encoding data representative of a request to change ownership of the one or more virtual goods or items in the blockchain.

124. The method of claim 121, wherein the one or more virtual goods or items include at least one non-fungible token (NFT).

125. The method of claim 121, wherein the one or more virtual goods or items include at least one game item.

126. The method of claim 125, wherein the at least one game item includes at least one of a skin, a crate, a token, a container, an NFT, a bin, an emoji, a character, a prize, a card, and a weapon.

127. The method of claim 121, wherein the establishing comprises establishing the connection with the blockchain to further facilitate recordation of the game result in the immutable ledger.

128. The method of claim 121 further comprising collecting game play data for the electronic game while the electronic game is running or upon completion of the electronic game.

129. The method of claim 128, wherein the establishing comprises establishing the connection with the blockchain to further facilitate recordation of the game play data in the immutable ledger.

130. The method of claim 128, wherein the determining comprises determining the game result further based on the collected game play data.

131. The method of claim 121, wherein the causing comprises causing the value to be awarded to the player after completion of the electronic game.

132. The method of claim 121, wherein the causing comprises causing the value to be transferred or credited to an account associated with the player.

133. The method of claim 132 further comprising receiving identifying information about the account associated with the player.

134. The method of claim 121, wherein the causing comprises converting the value from one form to another form.

135. The method of claim 121 further comprising deducting from the value a fee due to an entity facilitating play of the electronic game.

136. One or more non-transitory computer readable media having program instructions stored thereon which, when executed by one or more processors of a machine, cause the machine to:

receive a selection by a player of an electronic game;

enable the electronic game to be played using a computing device operable by the player;

determine a game result based on game play by the player in the selected electronic game;

cause value to be awarded to the player in one or more virtual goods or items in accordance with the game result;

generate metadata representing the virtual goods or items awarded;

generate a cryptographic hash of the metadata;

transmit the hash to a blockchain node for consensus-based inclusion in an immutable ledger; and wherein, when executed by the one or more processors, the program instructions further cause the machine to establish a connection with a blockchain to facilitate the value being caused to be awarded to the player in the one or more virtual goods or items.

137. A system for hosting one or more electronic games, the system comprising:

a communications interface; and one or more processors operatively coupled to the communications interface, and configured to:

receive, via the communications interface, a selection by a player of an electronic game;

enable the electronic game to be played using a computing device operable by the player;

determine a game result based on game play by the player in the electronic game; and cause value to be awarded to the player in accordance with the game result, wherein to cause the value to be awarded, the one or more processors are further configured to:

convert the value from a first form to a second form;

generate metadata representing the conversion transaction and resulting value state;

generate a cryptographic hash of the metadata;

transmit the hash to a blockchain node for consensus-based inclusion in an immutable ledger; and invoke a smart contract deployed on the blockchain to authorize and execute the value conversion.

138. The system of claim 137, wherein the one or more processors are further configured to collect, via the communications interface, game play data for the electronic game.

139. The system of claim 138, wherein the one or more processors are further configured to direct the communications interface to establish a connection with a blockchain to facilitate recordation of the game play data in the immutable ledger.

140. The system of claim 138, wherein to determine the game result, the one or more processors are further configured to determine the game result further based on the collected game play data.

141. The system of claim 137, wherein the one or more processors are further configured to direct the communications interface to establish a connection with a blockchain to facilitate recordation of the game result in the immutable ledger.

142. The system of claim 137, wherein to cause value to be awarded to the player, the one or more processors are further configured to cause the value to be awarded to the player after completion of the electronic game.

143. The system of claim 137, wherein to cause value to be awarded to the player, the one or more processors are further configured to cause the value to be awarded to the player in a cryptocurrency, a virtual currency, at least one non-fungible token (NFT), or one or more virtual goods or items.

144. The system of claim 143, wherein the one or more processors are further configured to direct the communications interface to establish a connection with a blockchain to facilitate the value being caused to be awarded to the player in the cryptocurrency, the virtual currency, the at least one NFT, or the one or more virtual goods or items.

145. The system of claim 137, wherein to cause value to be awarded to the player, the one or more processors are further configured to cause the value to be transferred or credited to an account associated with the player.

146. The system of claim 145, wherein the one or more processors are further configured to receive, via the communications interface, identifying information about the account associated with the player.

147. The system of claim 137, wherein the one or more processors are further configured to deduct from the value a fee due to an entity facilitating play of the electronic game.

148. A method in a system for hosting one or more electronic games, the method comprising:

receiving, via a communications interface, a selection by a player of an electronic game;

enabling the electronic game to be played using a computing device operable by the player;

determining a game result based on game play by the player in the electronic game; and causing value to be awarded to the player in accordance with the game result, wherein the causing comprises:

converting the value from a first form to a second form;

generating metadata representing the conversion transaction and resulting value state;

generating a cryptographic hash of the metadata;

transmitting the hash to a blockchain node for consensus-based inclusion in an immutable ledger; and invoking a smart contract deployed on the blockchain to authorize and execute the value conversion.

149. The method of claim 148 further comprising collecting game play data for the electronic game.

150. The method of claim 149 further comprising establishing a connection with a blockchain to facilitate recordation of the game play data in the immutable ledger.

151. The method of claim 149, wherein determining the game result comprises determining the game result further based on the collected game play data.

152. The method of claim 148 further comprising establishing a connection with a blockchain to facilitate recordation of the game result in the immutable ledger.

153. The method of claim 148, wherein the causing comprises causing the value to be awarded to the player after completion of the electronic game.

154. The method of claim 148, wherein the causing comprises causing the value to be awarded to the player in a cryptocurrency, a virtual currency, at least one non-fungible token (NFT), or one or more virtual goods or items.

155. The method of claim 154 further comprising establishing a connection with a blockchain to facilitate the value being caused to be awarded to the player in the cryptocurrency, the virtual currency, the at least one NFT, or the one or more virtual goods or items.

156. The method of claim 148, wherein the causing comprises causing the value to be transferred or credited to an account associated with the player.

157. The method of claim 156 further comprising receiving identifying information about the account associated with the player.

158. The method of claim 148, wherein the method further comprises deducting from the value a fee due to an entity facilitating play of the electronic game.

159. One or more non-transitory computer readable media having program instructions stored thereon which, when executed by one or more processors of a machine, cause the machine to:

receive a selection by a player of an electronic game;

enable the electronic game to be played using a computing device operable by the player;

determine a game result based on game play by the player in the selected electronic game; and cause value to be awarded to the player in accordance with the game result, wherein, when executed by the one or more processors to cause value to be awarded to the player, the program instructions further cause the machine to:

convert the value from a first form to a second form;

generate metadata representing the conversion transaction and resulting value state;

generate a cryptographic hash of the metadata;

transmit the hash to a blockchain node for consensus-based inclusion in an immutable ledger; and invoke a smart contract deployed on the blockchain to authorize and execute the value conversion.

* * * * *